United States Patent
Kudo et al.

(10) Patent No.: US 8,351,830 B2
(45) Date of Patent: Jan. 8, 2013

(54) BELT CONVEYING DEVICE AND IMAGE FORMING APPARATUS

(75) Inventors: Koichi Kudo, Kanagawa (JP); Hideaki Kibune, Kanagawa (JP); Takuro Kamiya, Kanagawa (JP); Junya Takigawa, Tokyo (JP); Hiroaki Takagi, Kanagawa (JP); Yuichi Hirose, Kanagawa (JP); Kazuya Nagao, Kanagawa (JP); Toshihiro Okamoto, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 349 days.

(21) Appl. No.: 12/659,564

(22) Filed: Mar. 12, 2010

(65) Prior Publication Data

US 2010/0232819 A1    Sep. 16, 2010

(30) Foreign Application Priority Data

Mar. 13, 2009  (JP) .................................. 2009-061362
Mar. 13, 2009  (JP) .................................. 2009-061363

(51) Int. Cl.
G03G 15/16    (2006.01)
B65G 23/04    (2006.01)

(52) U.S. Cl. .................................. 399/302; 198/810.03

(58) Field of Classification Search .................... 399/66, 399/162, 165, 302, 303, 308, 329, 51; 198/806, 198/835, 810.03; 474/102
See application file for complete search history.

(56) References Cited

U.S. PATENT DOCUMENTS

| | | | | |
|---|---|---|---|---|
| 5,404,202 A * | 4/1995 | Abramsohn | ..................... | 399/16 |
| 5,518,457 A * | 5/1996 | Seki et al. | ..................... | 474/102 |
| 6,842,602 B2 | 1/2005 | Kudo | | |
| 6,898,386 B2 * | 5/2005 | Takigawa | ..................... | 399/66 |
| 6,947,693 B2 | 9/2005 | Kamiya et al. | | |
| 7,448,715 B2 * | 11/2008 | Nakayama | ..................... | 347/19 |
| 7,532,370 B2 | 5/2009 | Kudo et al. | | |
| 7,905,346 B2 * | 3/2011 | Enomoto | ..................... | 198/807 |
| 8,086,156 B2 * | 12/2011 | Tao et al. | ..................... | 399/302 |
| 2008/0174791 A1 | 7/2008 | Kudo | | |
| 2008/0213009 A1 | 9/2008 | Kamoshita et al. | | |
| 2011/0205324 A1 * | 8/2011 | Shukuya | ..................... | 347/116 |

FOREIGN PATENT DOCUMENTS

| | | |
|---|---|---|
| JP | 2005-148127 | 6/2005 |
| JP | 2006-276427 | 10/2006 |
| JP | 3893300 | 12/2006 |
| JP | 3976924 | 6/2007 |
| JP | 2008-129518 | 6/2008 |
| JP | 4346832 | 7/2009 |

OTHER PUBLICATIONS

Abstract of JP 2002-323806 published on Nov. 8, 2002.
Abstract of JP 2003-284371 published on Oct. 3, 2003.
Abstract of JP 2000-233843 published on Aug. 29, 2000.

* cited by examiner

*Primary Examiner* — Robert Beatty
(74) *Attorney, Agent, or Firm* — Harness, Dickey & Pierce, P.L.C.

(57) ABSTRACT

A belt conveying device includes an endless belt stretched by a plurality of rollers; a drive unit that is connected to one of the plurality of rollers and drives the roller; a plurality of belt velocity detectors that are arranged at a plurality of locations along a belt width direction perpendicular to a moving direction of the endless belt and detect conveyance velocities of the endless belt; and a belt-inclination calculating unit that calculates an inclination of the endless belt in the moving direction from a difference between conveyance velocities of the endless belt detected by the plurality of belt velocity detectors.

20 Claims, 19 Drawing Sheets

NO SKEW

SKEW IS CHANGING

SKEW IS STABLE

FIG. 15
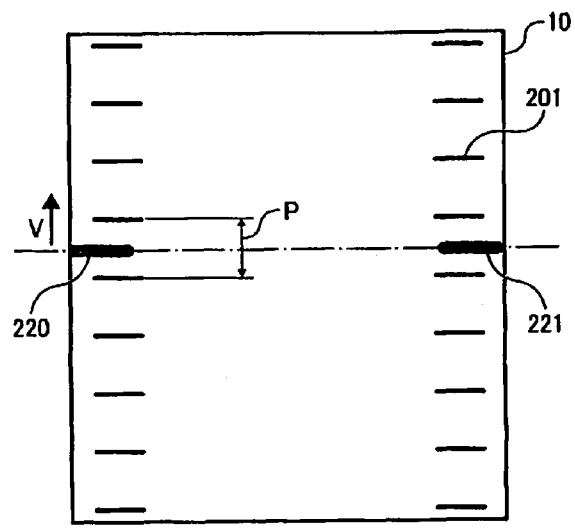
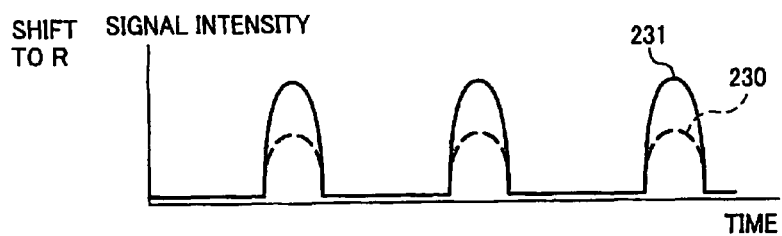
FIG. 16A
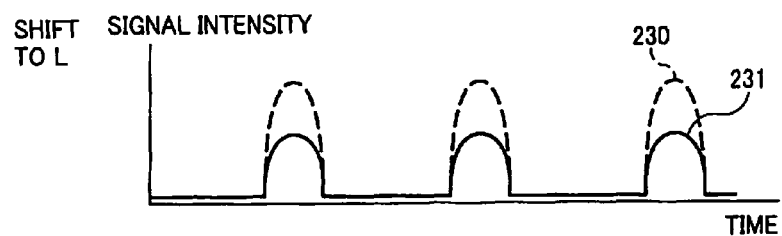
FIG. 16B
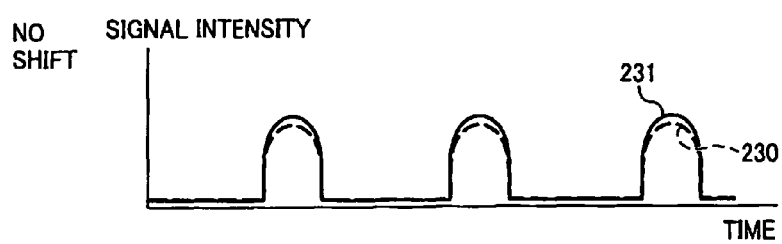
FIG. 16C

BELT CONVEYING DEVICE AND IMAGE FORMING APPARATUS

CROSS-REFERENCE TO RELATED APPLICATIONS

The present application claims priority to and incorporates by reference the entire contents of Japanese Patent Application No. 2009-061362 filed in Japan on Mar. 13, 2009 and Japanese Patent Application No. 2009-061363 filed in Japan on Mar. 13, 2009.

BACKGROUND OF THE INVENTION

1. Field of the Invention

The present invention relates to a belt conveying device, and particularly, to various types of belt conveying devices for use in an image forming apparatus, such as a copy machine and a printer, and an image forming apparatus provided with the same.

2. Description of the Related Art

As a conventional electrophotographic image forming apparatus, there is known an image forming apparatus that uses an intermediate transfer belt that is a transfer medium. There is also known an image forming apparatus that uses an endless conveyor belt as a conveying unit of a recording paper sheet that is a transfer medium. The belt used in these apparatuses is stretched by a plurality of rollers and is driven to rotate. During the rotation, there sometimes occurs a belt shift, in which a belt position moves in a direction (main scanning direction) perpendicular to a belt conveying direction, and also occurs a belt skew, in which the belt conveying direction is inclined toward the main scanning direction.

The occurrence of the belt skew causes a displacement of an image forming position on a transfer medium such as the intermediate transfer belt or the recording paper sheet, and this causes a distortion of an image. Moreover, in a color image forming apparatus that forms single-color images of black (hereinafter, "Bk"), yellow (hereinafter, "Y"), magenta (hereinafter, "M"), and cyan (hereinafter, "C") and superimposes these images on one another on the transfer medium to obtain a color image, each displacement between image forming positions results in a color misregistration between toner images of the respective colors. Because these lead to degradation in image quality, some measures have to be taken for the belt skew in order to obtain a high-quality image.

Various methods are proposed to deal with the above-mentioned problem. One method is to provide a shift guide member on an endless belt. In this method, the shift of the endless belt is suppressed by bringing the shift guide member provided on the surface of the belt into contact with an end face of a belt conveying roller so as to regulate the force in the main scanning direction produced in the belt. However, the belt skew caused by the deflection of the shift guide member in the main scanning direction or the deflection of the end face of the belt conveying roller cannot be suppressed and thus an image distortion or a color misregistration may occur.

Japanese Patent Application Laid-open No. 2005-148127 discloses a configuration that uses a shift guide member provided on a belt to regulate the belt shift. In the configuration, a position of a latent image formed on a photosensitive element is controlled based on a previously measured meandering component for one rotation of a belt.

Other than the method of providing the shift guide member on an endless belt, Japanese Patent Application Laid-open No. 2006-276427 discloses a configuration that uses a skew detector. When the skew of the endless belt is detected, i.e., the state where the endless belt is conveyed while being inclined with respect to the belt conveying direction is detected by the skew detector, an image distortion is corrected by an image forming unit based on a skew amount of the endless belt detected by the skew detector.

Moreover, for velocity fluctuation in a belt conveying direction (sub-scanning direction), there is known a technology for reading marks continuously formed on the surface of the belt at predetermined intervals by a mark detector, calculating a conveyance velocity of the belt from a time interval of mark reading signals output from the mark detector, and controlling the rotation of a motor rotating a drive roller based on the calculated velocity so that the conveyance velocity of the belt becomes a predetermined velocity. According to Japanese Patent Application Laid-open No. 2002-323806, by controlling the generation of an image signal of a latent-image forming unit, a color misregistration due to the displacement between image forming positions along the sub-scanning direction can be largely reduced. Furthermore, Japanese Patent Application Laid-open No. 2008-129518 discloses a belt conveying device that uses a 2D sensor for detecting a movement of a belt in the sub-scanning direction and a position of the belt in the main scanning direction. The belt conveying device performs a feedback control and a feedforward control based on a position of the belt in its shift direction.

However, there are the following problems in the method, disclosed in Japanese Patent Application Laid-open No. 2005-148127, of suppressing the belt shift by providing the shift guide member on the endless belt and suppressing an effect of belt meandering, which cannot be suppressed by the guide member, by controlling the latent-image forming position on the photosensitive element.

Because the meandering component for one rotation of the belt, which includes the meandering component caused by the deflection of the end face of the belt conveying roller and the deflection of the shift guide member in the main scanning direction, is previously measured, the belt meandering caused by the deflections of both the roller end face and the guide member can be suppressed. However, to deal with a deformation of the endless belt and the shift guide member over time and a deformation in association with changes in environment such as temperature and humidity, it is necessary to frequently measure the meandering component. This causes frequent interruption of the image forming operation, which largely hinders an increase in speed of image output. Moreover, there is also a problem in that dealing with a dynamic deformation due to effects of vibration or the like is difficult. In addition, in the method of suppressing the belt shift by providing the shift guide member on the endless belt, large external force is applied to the shift guide member when the belt is driven at a high speed, which causes buckling and breakage of the belt and the shift guide member. This makes it difficult to speed up image output.

Furthermore, the method, disclosed in Japanese Patent Application Laid-open No. 2006-276427, of controlling the latent-image forming position on the photosensitive element by detecting the belt skew without providing the shift guide member on the endless belt has the following problems.

In order to detect the belt skew, there is a first method that uses a control signal of a steering roller. The steering roller corrects the belt shift by controlling the inclination of the belt such that each portion on the belt always passes the same position after each rotation of the belt. The skew during one rotation is determined depending on inclined states of the rollers. The belt skew in an image transfer surface, to which an image is transferred from the photosensitive element, that affects an image distortion and a color misregistration is not always determined only by the inclination of the steering roller. If any roller other than the steering roller is inclined by temperature change or its variation over time, the belt skew cannot be accurately detected by the control signal of the steering roller. Thus, it is impossible to accurately correct the belt skew.

In order to detect the belt skew, there is a second method that forms a mark, which is used for detecting an image position, on a non-image area of an intermediate transfer belt and detects the mark by a mark detector. However, this method has a problem in that it is necessary, in order to form the mark for detecting an image position, to develop a latent image of the mark formed on the photosensitive element by toner and to transfer the developed latent image to the intermediate transfer belt. A large amount of toner is consumed in order to always detect the belt skew, which causes an increase in image formation cost. An ordinary image is transferred from the intermediate transfer belt to a recording sheet such as a paper sheet. In contrast, the mark for detecting an image position is not transferred and has to be removed by a cleaning member, which causes the load of intermediate-transfer-belt cleaning to increase and also may cause a cleaning failure.

In order to detect the belt skew, there is a third method that detects a belt edge at a plurality of positions along the belt conveying direction on the image transfer surface to which an image is transferred from the photosensitive element. However, unlike the conventional case in which only one belt edge sensor is provided to control the steering roller, this method requires a plurality of belt edge sensors, which causes an increase in cost. In addition, it is difficult in terms of layout that the belt edge sensors are arranged in the belt conveying direction of the image transfer surface along which a plurality of photosensitive elements for full-color image formation is arranged. This causes an enlarged device size due to an increase in a belt circumferential length and a cost increase.

Because the belt edge is detected as a signal for controlling the belt shift by the steering roller, edge data detected by the edge sensor shows a shape that includes a shape of the belt edge. To control meandering of the belt by referring to the previously measured edge data, it is necessary to synchronize, the belt. Thus, a detection signal from a belt home sensor for detecting a home position of the belt is required. Furthermore, there may occur so-called "belt meandering" in the intermediate transfer belt, by which the belt moves in the direction perpendicular to the belt conveying direction due to a manufacturing error of the intermediate transfer belt. A control is performed so that the "belt meandering" is prevented and edge positions of the intermediate transfer belt are made constant by detecting the edges of the intermediate transfer belt by the edge sensor and controlling the steering roller in accordance with the edge positions of the intermediate transfer belt detected by the edge sensor. In this case, even if the edge positions of the intermediate transfer belt are made constant, the "belt meandering" may remain if the edge positions of the intermediate transfer belt themselves are periodically displaced from predetermined positions. Thus, the periodic displacements of the edge positions of the intermediate transfer belt are previously detected by the edge sensor in a state in which the steering roller is not controlled. The data obtained by averaging the periodic displacements of the edge positions of the intermediate transfer belt is stored in a storage unit provided in a steering control circuit or the like. The displacements of the edge positions of the intermediate transfer belt that actually occur are detected based on displacement information for the edge positions of the intermediate transfer belt stored in the storage unit in order to prevent the "belt meandering". Because of these factors, an increase in device cost is inevitable.

SUMMARY OF THE INVENTION

It is an object of the present invention to at least partially solve the problems in the conventional technology.

A belt conveying device according to an aspect of the present invention includes an endless belt stretched by a plurality of rollers; a drive unit that is connected to one of the plurality of rollers and drives the roller; a plurality of belt velocity detectors that are arranged at a plurality of locations along a belt width direction perpendicular to a moving direction of the endless belt and detect conveyance velocities of the endless belt; and a belt-inclination calculating unit that calculates an inclination of the endless belt in the moving direction from a difference between conveyance velocities of the endless belt detected by the plurality of belt velocity detectors.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 15 is an explanatory diagram schematically representing a first example of a belt shift detector applied to the belt conveying device according to the first embodiment;

FIGS. 16A to 16C are graphs representing signal waveforms when the intermediate transfer belt moves in the main scanning direction in FIG. 15 (when belt shift occurs);

DETAILED DESCRIPTION OF THE PREFERRED EMBODIMENTS

Embodiments of the present invention are explained below.

First Embodiment

Figure 21:
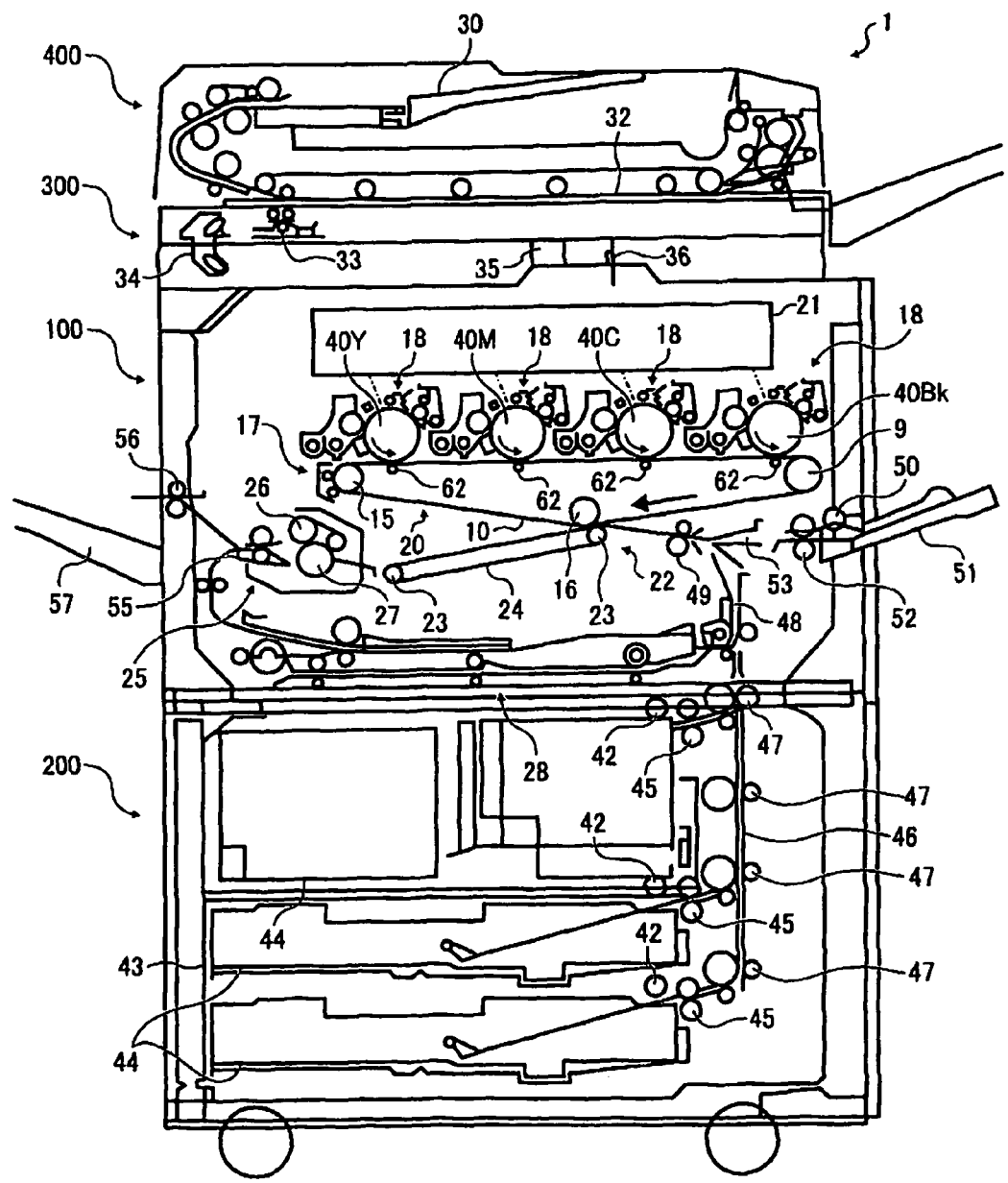
FIG. 21 is a diagram schematically representing one example of a color image forming apparatus according to the first embodiment.

FIG. 21 schematically represents one example of a color image forming apparatus 1. The color image forming apparatus 1 is explained first.

In the color image forming apparatus 1, an apparatus body 100 is placed on a paper feed table 200 as shown in this figure. A scanner 300 is fitted on the apparatus body 100 and an automatic document feeder (ADF) 400 is fitted on the scanner. Provided in the apparatus body 100 is a transfer device 20 that includes an intermediate transfer belt 10 which is a belt-like endless moving member provided in nearly the center of the apparatus body 100. The intermediate transfer belt 10 is stretched by a drive roller 9, a driven roller 15, and a secondary-transfer opposed roller 16, so that it rotates clockwise in FIG. 21.

Furthermore, the intermediate transfer belt 10 is configured to remove residual toner remaining on the surface thereof after an image is transferred by a cleaning device 17 provided on the left side of the driven roller 15. Arranged above a linear portion of the intermediate transfer belt 10 stretched between the drive roller 9 and the driven roller 15 are four drum-like photosensitive elements 40Y, 40M, 40C, and 40Bk (hereinafter, simply referred to as "photosensitive elements 40" unless otherwise specified) of yellow (Y), magenta (M), cyan (C), and black (Bk) at predetermined intervals along the moving direction of the intermediate transfer belt 10. Four primary transfer rollers 62 are provided opposed to the photosensitive elements 40 inside the intermediate transfer belt 10 so as to sandwich the intermediate transfer belt 10 therebetween.

Figure 22:
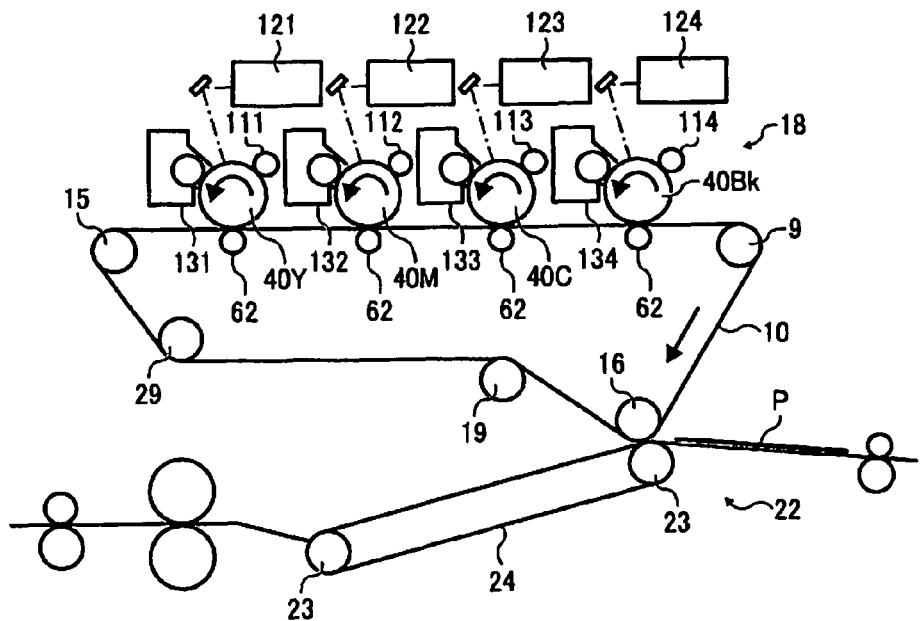
FIG. 22 is a diagram representing a part of another image forming apparatus according to the first embodiment.

It should be noted that, as shown in FIG. 22, a tension roller 19 for adjusting belt tension may further be provided for the intermediate transfer belt 10.

Each of the four photosensitive elements 40 is rotatable counterclockwise as shown in FIG. 22. Arranged around each of the four photosensitive elements 40 are a charging device 111 for yellow, a charging device 112 for magenta, a charging device 113 for cyan, and a charging device 114 for black, which are charging units. Arranged around each of the four photosensitive elements 40 are a developing device 131 for yellow, a developing device 132 for magenta, a developing device 133 for cyan, and a developing device 134 for black, which are developing units. Furthermore, the primary transfer roller 62, and a photosensitive-element cleaning unit and a neutralization unit which are not shown, are arranged around each of the four photosensitive elements 40, and these components form each of imaging units 18. An exposing unit 21 is provided above the four imaging units 18, in which an exposing device 121 for yellow, an exposing device 122 for magenta, an exposing device 123 for cyan, and an exposing device 124 for black are arranged, as shown in FIG. 22.

Toner images of the colors each formed on each photosensitive element by the charging device, the exposing device, and the developing device are sequentially transferred to the intermediate transfer belt 10 in a direct superimposing manner.

Meanwhile, a secondary transfer device 22 being a transfer unit for transferring the toner images on the intermediate transfer belt 10 to a sheet P being a recording paper is provided below the intermediate transfer belt 10. The secondary transfer device 22 is formed with a secondary transfer belt 24 being an endless belt which is wound around between two rollers 23 and 23, so that the secondary transfer belt 24 is pressed against the secondary-transfer opposed roller 16 through the intermediate transfer belt 10.

The secondary transfer device 22 collectively transfers the toner images on the intermediate transfer belt 10 to the sheet P fed into between the secondary transfer belt 24 and the intermediate transfer belt 10.

Provided on the downstream side of the secondary transfer device 22 in a sheet conveying direction is a fixing device 25 for fixing the toner images on the sheet P, where a pressing roller 27 is pressed against a fixing belt 26 being an endless belt.

It should be noted that the secondary transfer device 22 performs a function of conveying the sheet after the image is transferred to the fixing device 25. The secondary transfer device 22 may also be a transfer device using a transfer roller or a non-contact charger. Provided on the lower side of the secondary transfer device 22 is a sheet reversing device 28 that reverses a sheet when images are formed on both sides of the sheet.

As explained above, the apparatus body 100 forms a tandem-type color image forming apparatus 1 of an indirect transfer system.

When a color copy is made by the color image forming apparatus 1, an original is set on an original tray 30 of the automatic document feeder 400. If an original is set manually, then the automatic document feeder 400 is opened, the original is set on a contact glass 32, and the automatic document feeder 400 is closed to press the original.

Then, a start key (not shown) is pressed, and the original, when being set on the original tray 30 of the automatic document feeder 400, is fed to the contact glass 32. Further, when an original is set manually on the contact glass 32, the scanner 300 is immediately driven, and a first carriage 33 and a second carriage 34 start moving. A light is irradiated from a light source of the first carriage 33 toward the original, and a reflected light from the original surface goes to the second carriage 34, and then the light is reflected by a mirror of the second carriage 34, passes through an imaging lens 35, and enters a reading sensor 36, where a content of the original is read.

The start key is pressed to cause the intermediate transfer belt 10 to start rotating. Further, at the same time, the photosensitive elements 40Y, 40M, 40C, and 40Bk, start rotating, and operations of forming toner images of single colors of yellow (Y), magenta (M), cyan (C), and black (Bk) on the respective photosensitive elements are started. The toner images of the respective colors formed on the photosensitive elements are sequentially transferred in a superimposing manner to the intermediate transfer belt 10 rotating clockwise in FIG. 21 and FIG. 22, and a full-color composite color image is formed thereon.

Meanwhile, the pressing of the start key causes a paper feed roller 42 at a selected paper feed stage in the paper feed table 200 to be rotated, and sheets P are fed from selected one paper feed cassette 44 in a paper bank 43. The sheets P are separated into one sheet by a separation roller 45 and the one sheet is conveyed to a paper feed path 46. The sheet P is conveyed by a conveying roller 47 to a paper feed path 48 in the apparatus body 100, and abuts against a registration roller 49 to stop.

Further, in a case of manual paper feeding, the sheets P set on a manual feed tray 51 are fed by rotation of a paper feed roller 50, are separated into one sheet by a separation roller 52 to be conveyed to a manual paper feed path 53, and the sheet P abuts against the registration roller 49 to stop.

The registration roller 49 is caused to start rotating at an accurate timing to match with the composite color image on the intermediate transfer belt 10, and feeds the sheet P in a stopped state into between the intermediate transfer belt 10 and the secondary transfer device 22. Then, the color image is transferred to the sheet P by the secondary transfer device 22.

The sheet P with the color image transferred thereto is conveyed by the secondary transfer device 22 also having a function as a conveying device to the fixing device 25, where heat and pressure are applied to the color image so that the transferred color image is fixed on the sheet P. Thereafter, the sheet P is guided by a switching claw 55 to an ejection side, and is ejected by an ejection roller 56 on a paper ejection tray 57, where the sheet P is stacked.

Moreover, when a two-sided copy mode is selected, the sheet P with an image on one side thereof is conveyed by the switching claw 55 to the side of the sheet reversing device 28, where the sheet P is reversed to be again guided to a transfer position. This time, an image is formed on the backside of the sheet P, and then the sheet P is ejected to the paper ejection tray 57 by the ejection roller 56.

Figure 1:
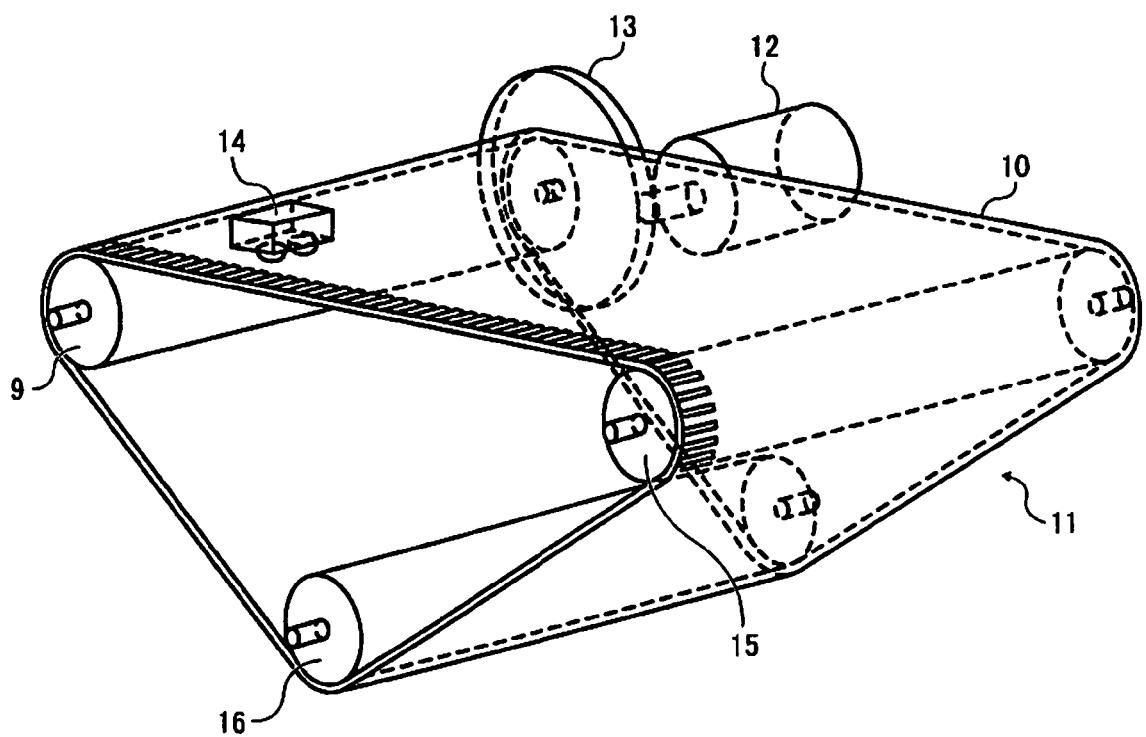
FIG. 1 is a diagram representing a first example of a belt conveying device according to a first embodiment of the present invention.

FIG. 1 represents a first example of a belt conveying device 11 according to the first embodiment.

The belt conveying device 11 is a device that causes a drive motor 12 to activate the intermediate transfer belt (endless belt) 10 stretched by the drive roller 9, the driven roller 15, and the secondary-transfer opposed roller 16. The drive motor 12 is connected to the drive roller 9 through a speed reducer 13 connected to the drive motor 12, and rotates the drive roller 9 to cause the intermediate transfer belt 10 to rotate. When the belt conveying device 11 is used for the intermediate transfer belt 10 which is applied to the color image forming apparatus 1, velocity of a belt surface can be maintained to be constant by controlling the drive motor 12 while a velocity detector 14 senses marks formed on the belt surface to detect the velocity of the belt surface.

Next, a method of sensing belt skew is explained.

Figure 2:
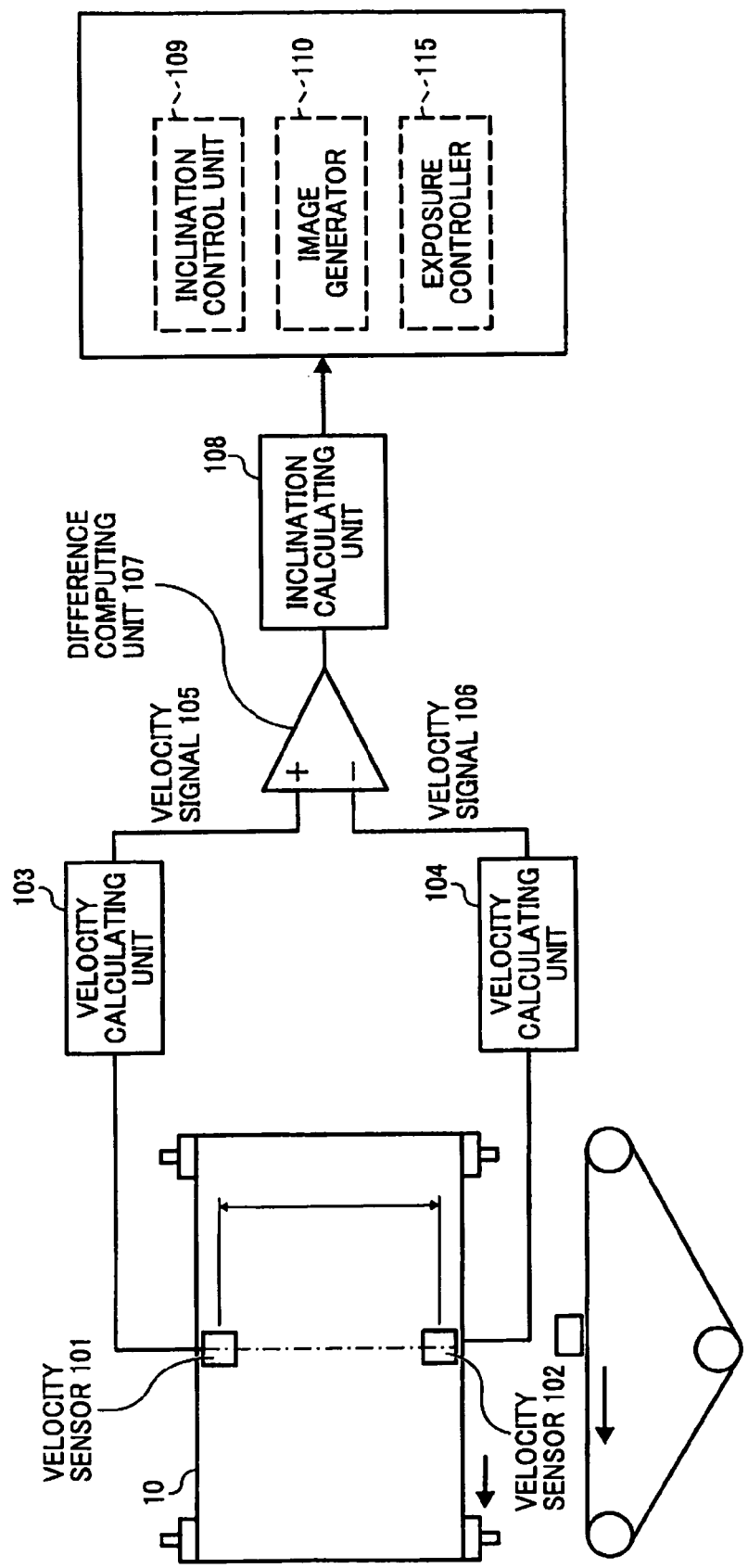
FIG. 2 is a schematic diagram of the belt conveying device in FIG. 1.

FIG. 2 represents a schematic diagram of the belt conveying device 11. The drive motor 12 and the speed reducer 13 are omitted herein.

In FIG. 2, the velocity detector 14 is represented as velocity sensors 101 and 102, which are arranged at two locations along the direction perpendicular to the conveying direction of the intermediate transfer belt 10. Although FIG. 2 represents the example of arranging the velocity sensors as the velocity detectors at both edges of the intermediate transfer belt 10, the locations may not be at the both edges.

Furthermore, as the velocity detector 14, various units that measure the surface velocity can be used, and the generality of the present invention is not lost even if any of them is used. An example of the velocity detector 14 includes, if it may be in contact with the belt surface, those of attaching a rotary roller to a rotating shaft of a rotary encoder called roller encoder and causing the rotary roller to rotate due to friction with an object in contact therewith to measure a rotational speed of the roller.

A non-contact measuring means includes a laser-Doppler velocity meter, an image detection type method adopted in an optical mouse, or a method of putting a linear scale to the belt surface and measuring it by using a linear encoder sensor, and further a method of providing optical marks and magnetic marks at intervals and calculating velocity from a signal period when the marks are read by a sensor.

When the marks are detected by the velocity sensors 101 and 102, mark detection signals are output. The mark detection signals are converted by velocity calculating units 103 and 104 to velocity signals 105 and 106, and a velocity difference is computed by a difference computing unit 107. For example, if the velocity signal is converted to a voltage signal according to the velocity, a difference between voltages is computed by the difference computing unit 107, to obtain a voltage signal indicating the velocity difference. Furthermore, if the velocity signal is converted to a frequency pulse signal according to the velocity, a difference between frequencies is computed by the difference computing unit 107.

An amount of belt skew (belt skew amount) is calculated by an inclination calculating unit 108 from a velocity-difference signal output from the difference computing unit 107.

Based on the calculated amount of belt skew, for example, an inclination can be mechanically corrected by an inclination control unit 109 of the belt conveying device. Alternatively, an output image can be corrected by an image generator 110 according to distortion thereof, or image distortion due to belt skew can also be corrected by controlling exposure timing by an exposure controller 115.

Next, the principle of sensing belt skew by calculating a difference between velocities and a difference between moving distances of the intermediate transfer belt 10 is explained with reference to FIGS. 3A to 3C.

Figure 3A:
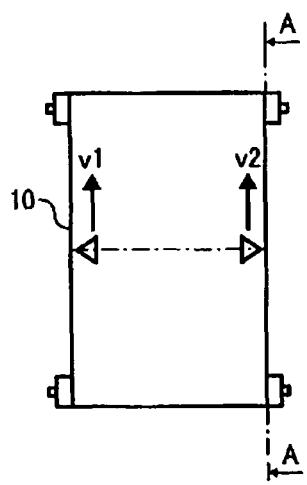
FIGS. 3A to 3C are explanatory diagrams representing a principle of sensing a belt skew by calculating a difference between velocities and a difference between moving distances of the intermediate transfer belt.

FIG. 3A represents a schematic diagram of the belt conveying device when there is no belt skew, which shows a state in which the moving direction of the belt (hereinafter, "sub-scanning direction") and the edges of the belt are parallel to each other. FIG. 3B represents a state in which skew of the belt starts and a skew angle of the belt is gradually changing. FIG. 3C represents a state in which the skew angle of the belt becomes fixed and the skew is stable.

Here, a position for observing velocity is portions of both edges of the belt along the direction perpendicular to the moving direction of the belt (hereinafter, "main scanning direction"), and velocities observed are v1 and v2. A reference line A-A is shown as a line parallel to the sub-scanning direction of the belt.

Figure 3C:
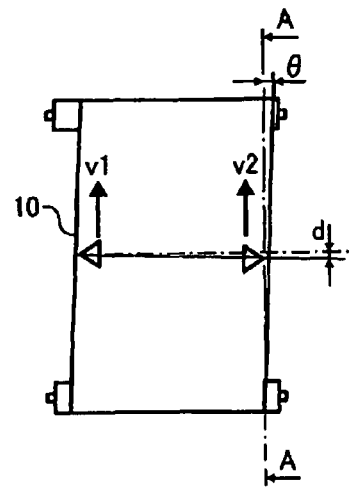
Figure 4:
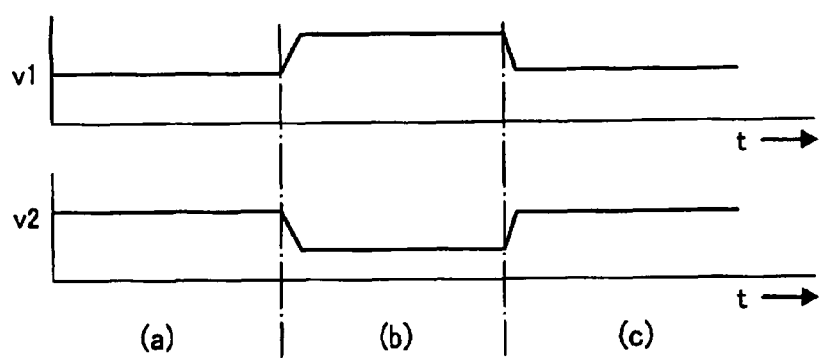
FIG. 4 is an explanatory diagram representing how velocities v1 and v2 change when a skew state of the belt changes.

FIG. 4 represents how the velocities v1 and v2 change when a skew state of the belt changes. The conveyance velocities at the both edges of the belt do not change, or v1=v2, in an initial state in which the skew of the belt does not occur as shown in FIG. 3A and in a state in which the skew of the belt is stable as shown in FIG. 3C.

Figure 3B:
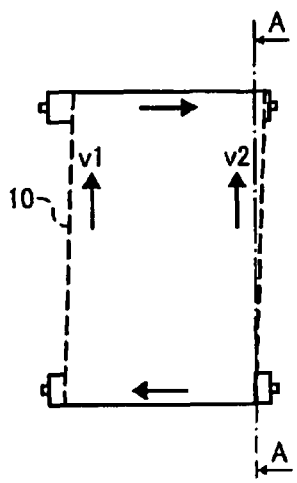

Here, there is considered a case in which while the skew angle of the belt is gradually changing as shown in FIG. 3B, a skew angle θ changes to its stable state as shown in FIG. 3C. In the state in which the skew angle is gradually changing in FIG. 3B, v1 increases and v2 decreases as shown in FIG. 4. If the skew angle becomes fixed at the angle θ as shown in FIG. 3C, then v1 and v2 return to the same velocity as shown in (c) of FIG. 4.

The velocities between the two points of the belt change depending on the belt skew as shown in FIG. 4, and thus, by observing a velocity difference between the two, changes in the belt skew can be observed.

Figure 5:
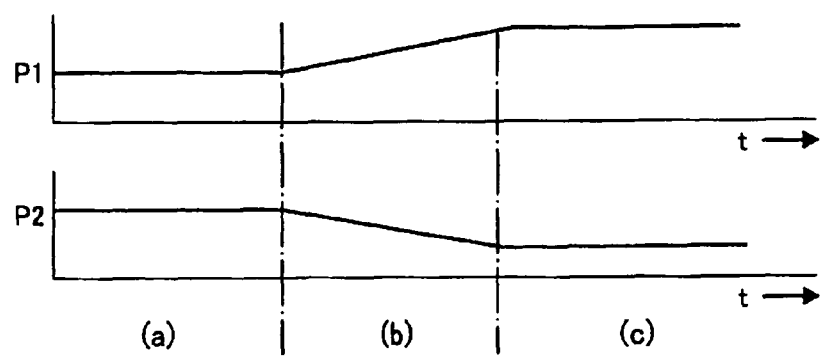
FIG. 5 is an explanatory diagram representing how the moving distance changes when a skew state of the belt changes.

FIG. 5 represents how the moving distance changes at this time. Because an accumulated moving distance is shown as an upward graph if the velocity is positive, there are shown differences P1 and P2 from the accumulated moving distance when the belt is moving at a constant linear velocity. The moving distance is the value of integral of the velocities, and thus, a distance deviation occurs in a zone where the velocities in FIG. 3B and in (b) of FIG. 4 are changing (skew angle is changing). In the state in which the skew angle is stable at a fixed angle as shown in FIG. 3C and in (c) of FIG. 4, the moving distance becomes a fixed value with a fixed deviation. In a measurement position of v1 and a measurement position of v2, d=L tan θ where L is a distance between the observing positions. Here, a difference d between the moving distances is determined from a difference between distances each obtained by integrating the velocities v1 or v2, and thus, the skew angle θ is also determined.

In this manner, it is understood that "change in skew" is obtained by the velocity difference between the two points of the belt along the main scanning direction and that "skew angle" is obtained by the difference between the moving distances.

Figure 6A:
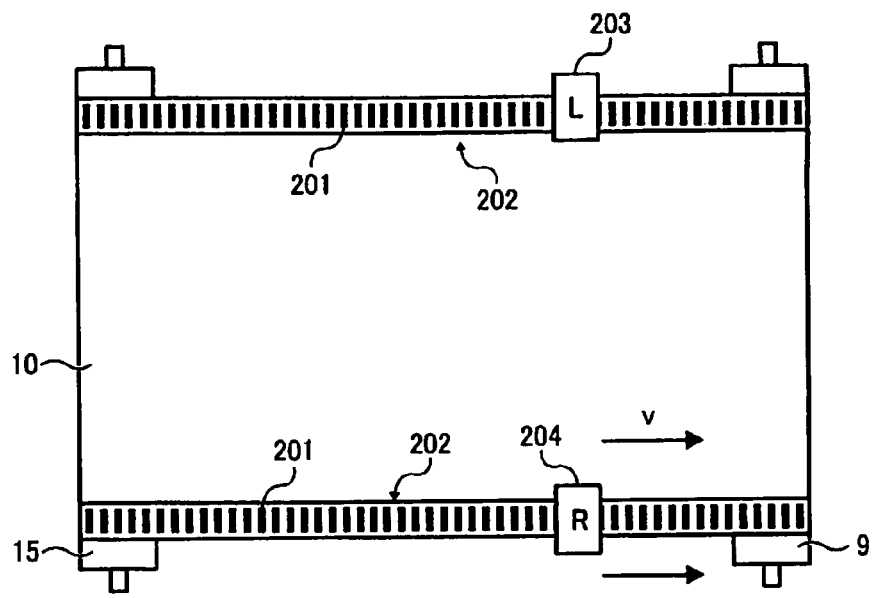
FIGS. 6A and 6B are explanatory diagrams schematically representing a second example of the belt conveying device according to the first embodiment.
Figure 6B:
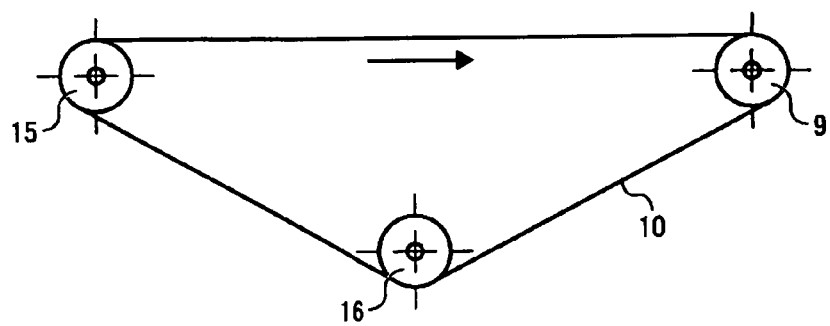

FIGS. 6A and 6B schematically represent a second example of the belt conveying device according to the first embodiment.

This example is configured with scale portions 202 each formed of a plurality of marks 201 provided on the intermediate transfer belt 10 so as to be continuous at predetermined intervals along the sub-scanning direction of the intermediate transfer belt 10, mark detectors 203 and 204 that read the marks 201 of the scale portions 202, respectively, and a calculating unit that calculates a moving velocity or a moving distance of the intermediate transfer belt 10 by outputs of the mark detectors 203 and 204.

As shown in FIGS. 6A and 6B, the scale portions 202 and the mark detectors 203 and 204 being sensors are arranged in both edges of the belt along the main scanning direction. As the scale portions 202 and the mark detectors 203 and 204, generally, an optical sensor can be easily adopted. Alternatively, a combination of a magnetic mark and a magnetic sensor, or a metal mark and an electrostatic capacity sensor may be used.

Figure 7:
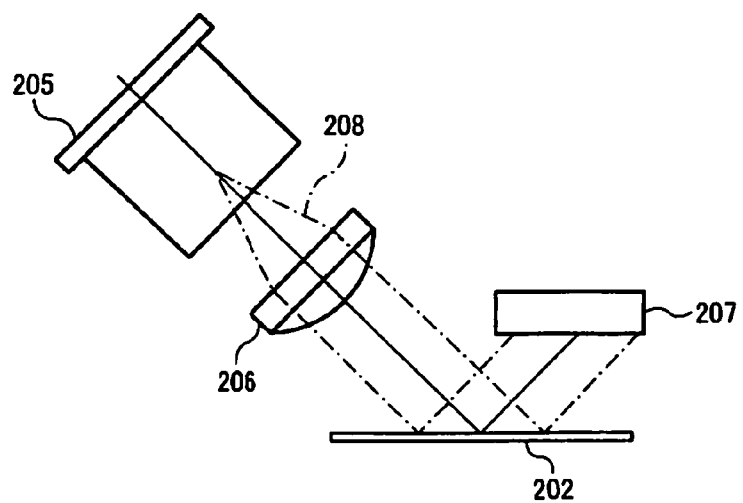
FIG. 7 is an explanatory diagram representing an example of a scale formed of optical marks and a mark detector as a sensor.

FIG. 7 represents an example of a scale formed of optical marks and the mark detector as an optical sensor according to the embodiment. If marks causing the reflectivity to be changed are to be used, a reflection type of optical sensor as shown in this figure can be used as the mark detector. As shown in FIG. 7, a light beam 208 emitted from a light source 205 such as LED is converged by a lens 206, hits against the scale portion 202, is reflected thereby, and the reflected light is received by a light-receiving element 207.

Figure 8:
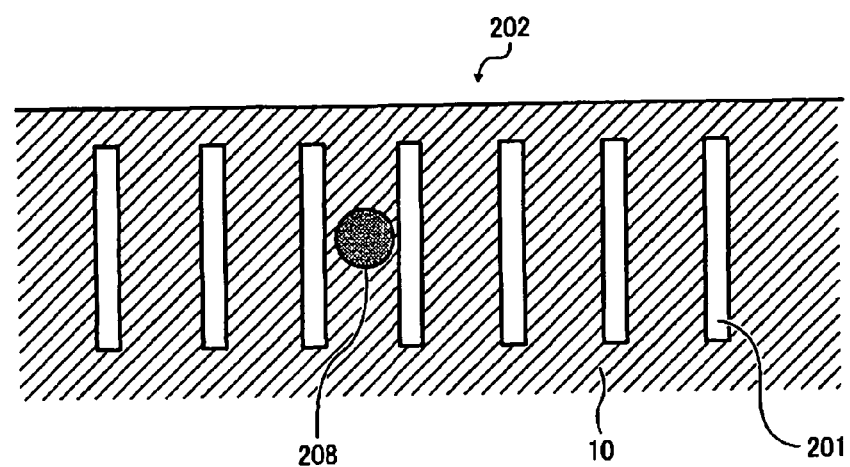
FIG. 8 is an explanatory diagram representing an example of a scale portion using reflection-type marks.

FIG. 8 represents an example of the scale portion 202 using the reflection-type marks 201. If the intermediate transfer belt 10 is in black color and has a low reflectivity, then, white-color scattering marks with high reflectivity and full-reflective marks can be used as the marks 201. The mark 201 is desirably long enough in the main scanning direction of the belt as shown in FIG. 8 so that even if belt shift occurs, the light beam 208 hits the mark 201 and the mark 201 is stably detected.

Figure 9:
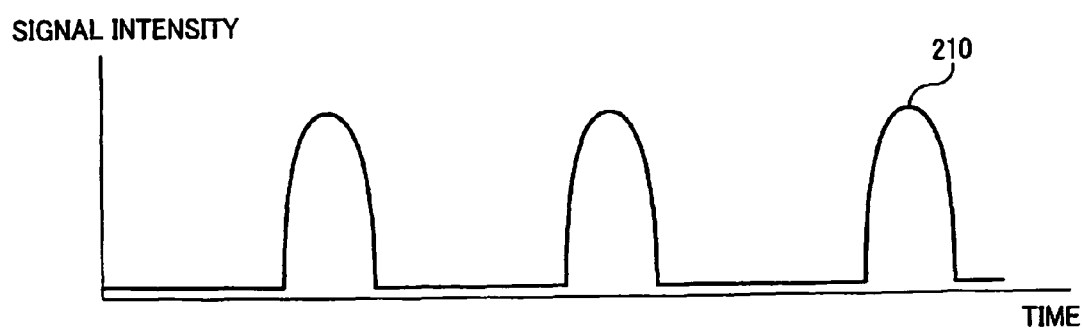
FIG. 9 is a graph representing a relationship between time of a signal and signal intensity in the sensor.

FIG. 9 represents a relationship between time and signal intensity, which is an output example from the mark detector when the intermediate transfer belt 10 configured in the above manner is conveyed. The signal obtained by the light-receiving element 207 becomes a high level because the reflection intensity is high in a mark detected portion 210 from the mark with high reflectivity, and becomes a low level in a portion where the reflection intensity is low and there is no mark. The signal may be used at an analog voltage as it is or may be digitized by using a comparator in order to become resistant to electronic transmission noise.

Here, if the marks 201 of the scale portion 202 are formed at constant intervals, a signal period obtained from the mark detector becomes a period according to a conveyance velocity of the intermediate transfer belt 10. Here, a belt velocity V is expressed as V=P/T, where T is a signal period and P is an interval between the marks 201. Further, by calculating the number of detected marks 201, a moving distance of the intermediate transfer belt 10 can also be calculated.

Figure 10:
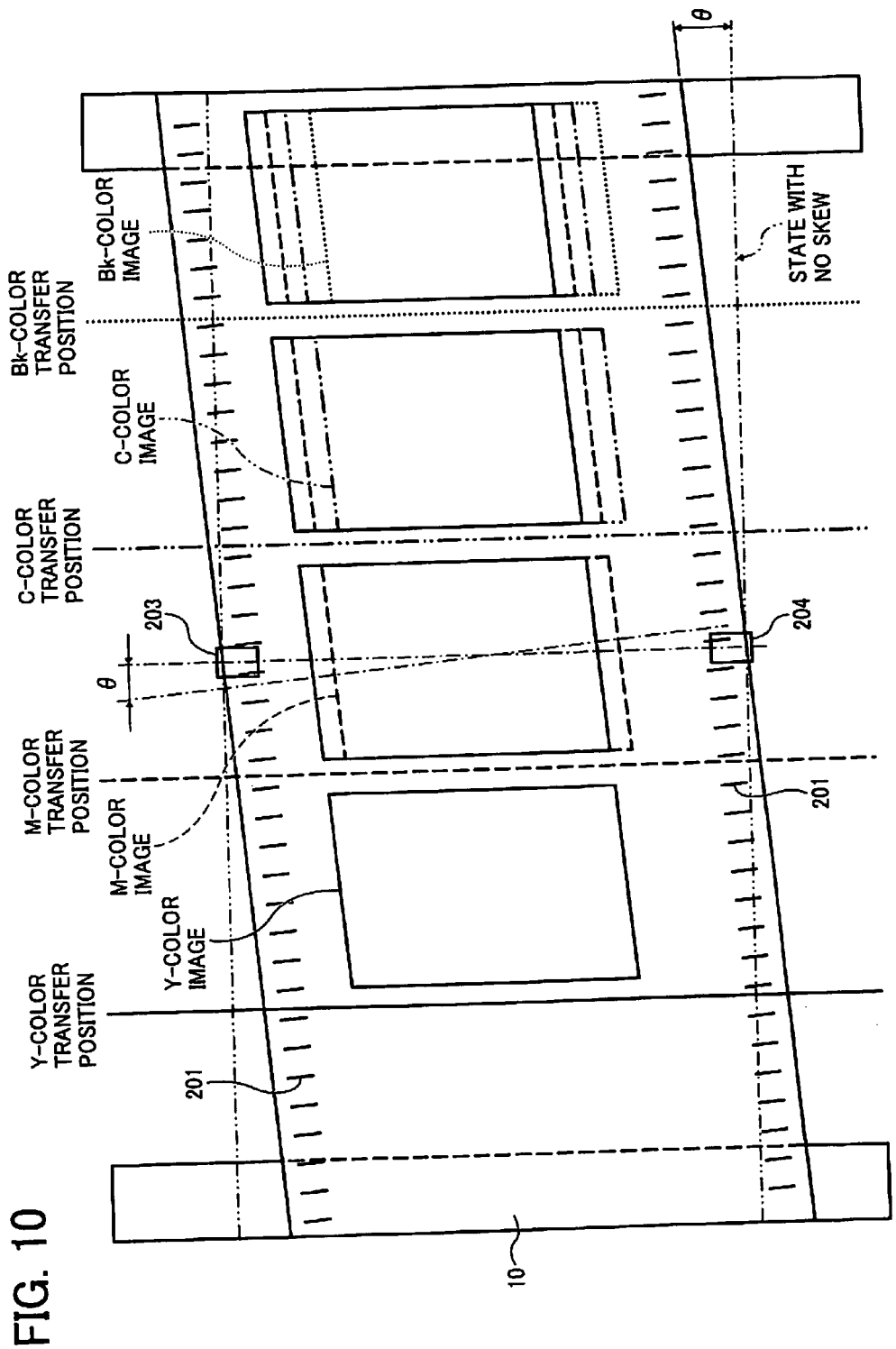
FIG. 10 is an explanatory diagram representing a detection of the belt skew and also representing a state in which the belt skew occurs.

Next, a method of calculating a belt skew from a time difference (phase difference) of the mark detection signals is explained with reference to FIG. 10, FIG. 11, and FIG. 12. In FIG. 10, a dashed one-dotted line represents a conveying state of the belt with no belt skew, and a solid line represents a conveying state of the belt in which the belt is skewed by an angle θ with respect to the main scanning direction.

Because of the effect of inclinations or the like of the rollers for conveying the belt, the intermediate transfer belt 10 is conveyed in a direction inclined by the angle θ in the image transfer surface. Therefore, as shown in FIG. 10, images formed on the image transfer surface are inclined by the angle θ, and transfer positions, on the intermediate transfer belt 10, of the images (yellow (Y), magenta (M), cyan (C), and black (Bk)) formed on the image carriers are displaced in the main scanning direction. As a result, there occur image distortion and color misregistration in a color image.

Moreover, timings at which the mark detectors 203 and 204 detect the marks 201 provided to detect the velocity of the intermediate transfer belt 10 in the sub-scanning direction also change due to the effect of the skew angle θ of the belt. Therefore, the marks 201 are formed at two locations along the main scanning direction of the belt, and the marks are detected by the mark detectors 203 and 204 arranged in the positions respectively opposed to the marks, so that the skew of the intermediate transfer belt 10 is detected.

Figure 11:
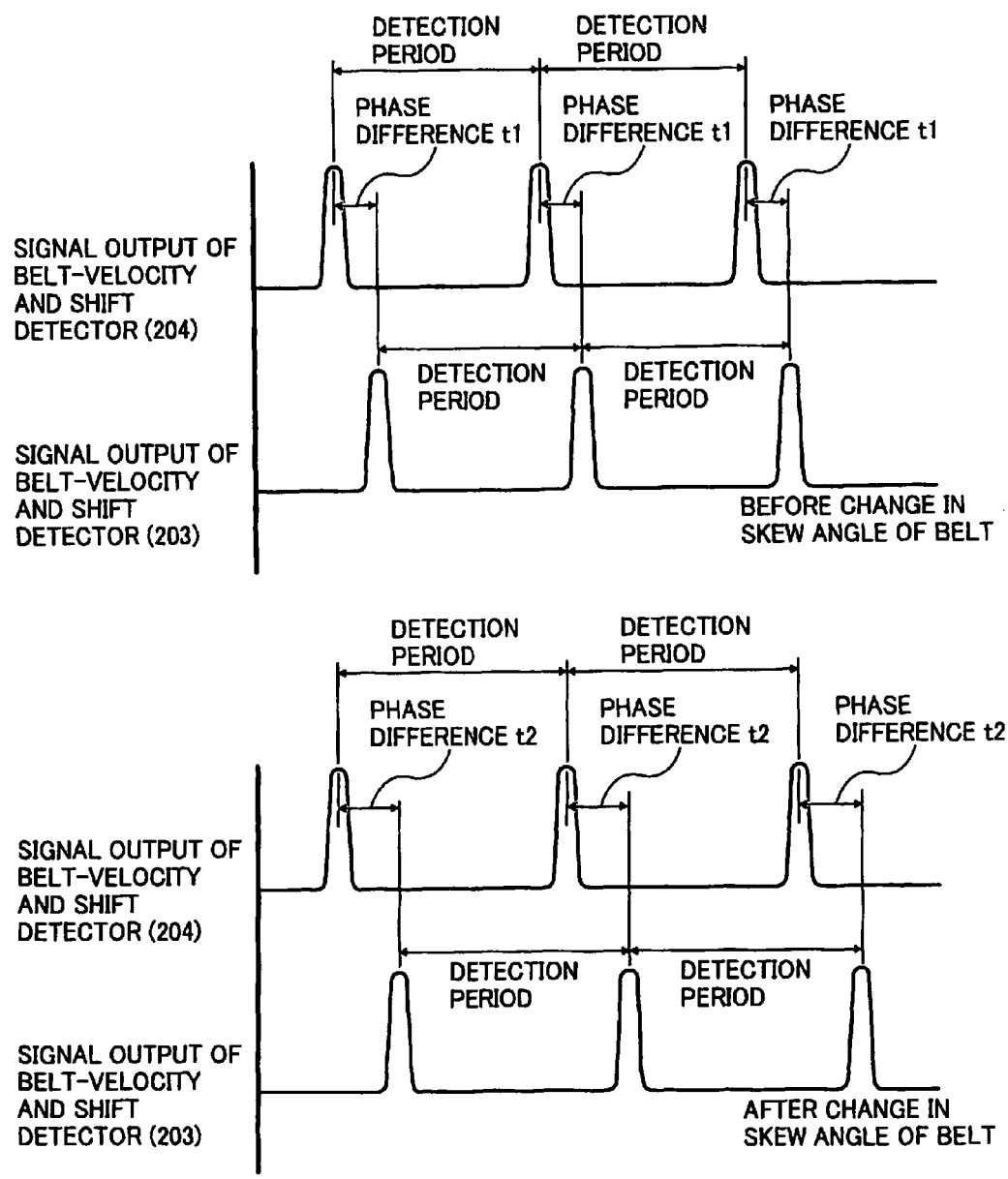
FIG. 11 is an explanatory diagram representing signal waveforms in a state in which the belt skew occurs.
Figure 12:
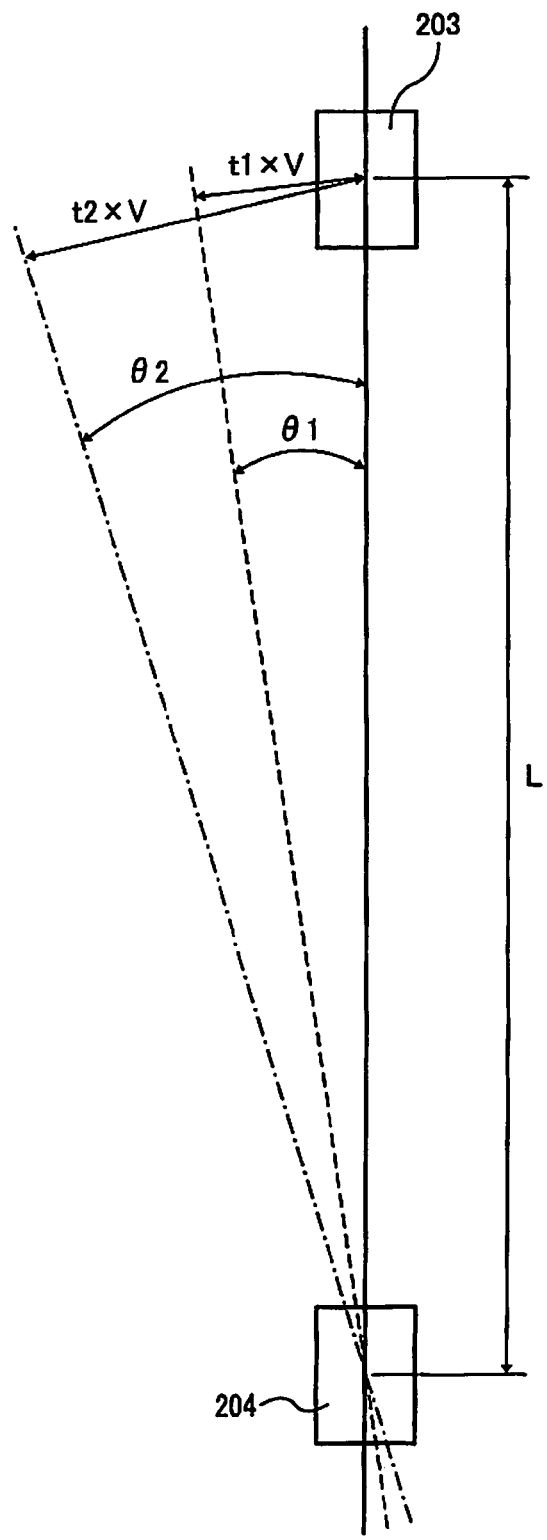
FIG. 12 is an explanatory diagram representing a moving distance when a skew angle of the belt is changed from θ1 to θ2.

FIG. 11 represents signals detected by the mark detectors 203 and 204, respectively. When the skew angle θ of the intermediate transfer belt changes, a phase difference of mark detection periods at two detected positions along the main scanning direction changes, and thus, by detecting the change in the phase difference, the change in the skew angle of the intermediate transfer belt can be detected. The image forming position on the image carrier is corrected by an image-forming-position correcting unit according to a change in the skew angle of the belt occurring after the image forming position is adjusted. Such adjustment is generally performed when the image forming apparatus is activated. Thus, the image forming position on the intermediate transfer belt in the main scanning direction is corrected. This allows correction of image distortion and color misregistration in the color image.

In FIG. 11, a phase difference of the detection signals by the two mark detectors 203 and 204 before the belt skew is changed is t1, and a phase difference of the detection signals after the belt skew is changed is t2. If t1<t2, the intermediate transfer belt is rotated in a direction (counterclockwise) in which the angle θ increases in FIG. 10. Here, if an angle before the belt skew changes is θ1, an angle after the belt skew changes is θ2, and a distance between the two mark detectors 203 and 204 is L, and a conveyance velocity of the belt in the sub-scanning direction is V, then, as shown in FIG. 12, the following relation holds:

$$L \times \sin\theta 2 - L \times \sin\theta 1 = t2 \times V - t1 \times V.$$

Here, because θ1 and θ2 are minute angles, when sin θ is changed as θ, then $$L \times \theta 2 - L \times \theta 1 = t2 \times V - t1 \times V.$$

Therefore, an angle change (θ2−θ1) changed after the image forming position is adjusted becomes $$\theta 2 - \theta 1 = (t2 - t1) V/L.$$

From this, by using a change in the phase difference (t2−t1) of the detection signals by the belt velocity detectors 203 and 204, the angle change (θ2−θ1) can be determined.

As explained above, by using the scale portions 202 formed of the marks 201 at constant intervals and the mark detectors 203 and 204, the belt skew can be easily determined. By calculating a period by a mark sensor and a time delay of two sensors by a counter using a high speed clock, the velocity and the skew can be calculated with high accuracy, and because the digital signal can be used, the signal becomes resistant to noise.

Figure 13A:
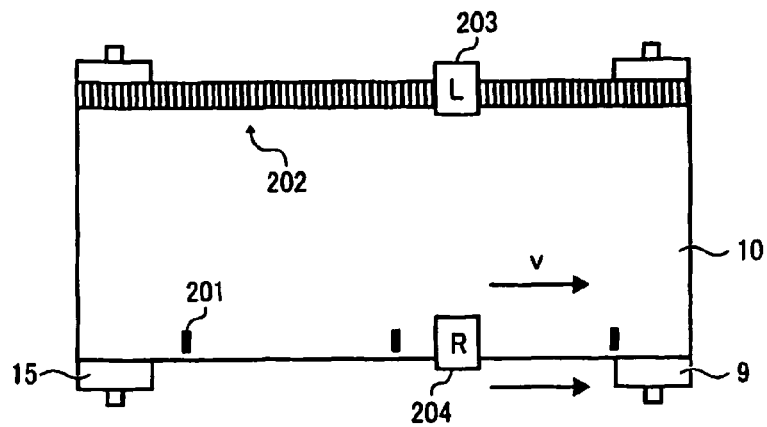
FIGS. 13A and 13B are explanatory diagrams representing a third example of the belt conveying device according to the first embodiment.
Figure 13B:
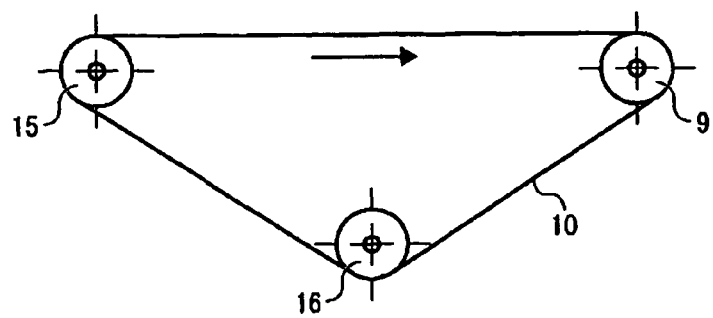

FIGS. 13A and 13B represent a third example of the belt conveying device according to the first embodiment.

In this example, unlike the above-mentioned example, one side of the marks provided along the both edges of the intermediate transfer belt 10 is the scale portion 202 formed of the marks 201 formed at a continuous pitch, and the other side thereof is formed only of identifying marks 201 which are provided at a slightly larger interval corresponding to each position of any one of the marks 201. Any of the marks 201 of the scale portion 202 and an identifying mark 201 are located along the main scanning direction and correspond to each other. Therefore, if a displacement between the identifying mark 201 and the mark 201 of the scale portion 202 is within one pitch, a velocity difference or a time difference between the two is measured by the mark detectors 204 and 203, and a skew angle of the intermediate transfer belt 10 can be detected in the same manner as that of the second example.

Thus, the scale portion which costs comparatively high is formed only on one side and only the marks are formed on the other side, which allows the cost to be lower.

Figure 14A:
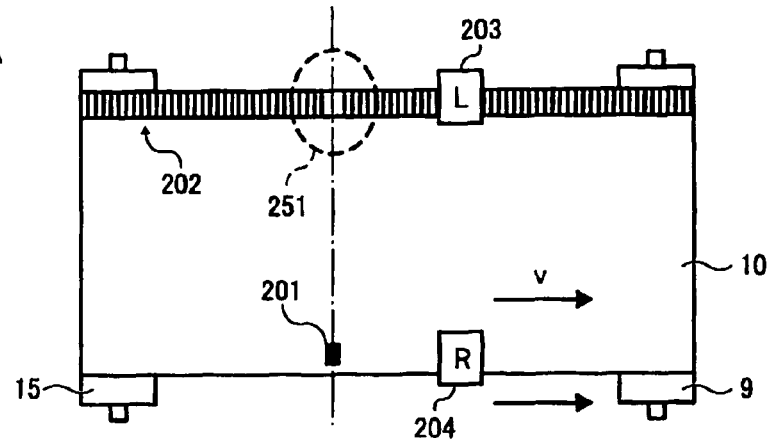
FIGS. 14A and 14B are explanatory diagrams representing a fourth example of the belt conveying device according to the first embodiment.
Figure 14B:
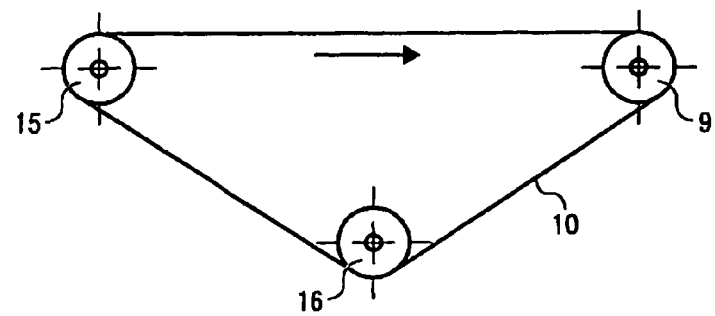

FIGS. 14A and 14B represent a fourth example of the belt conveying device according to the first embodiment.

In this example, as a method of forming marks on the intermediate transfer belt 10, there is adopted a method of attaching a resin tape as a flexible member, on which a plurality of marks 201 is continuously formed at constant intervals, to one side of the belt along a direction of endless movement thereof. In addition to this method, there is a method of forming the marks 201 concurrently when the belt is formed, but this method does not allow the mark interval to be constant if a shrinking percentage of the whole belt is nonuniform. However, according to an attachment method of the present invention, even if the shrinking percentage of the whole belt is nonuniform, the mark interval can be made constant without affecting the interval of the marks.

However, a belt circumferential length is different dependent on belts manufactured due to manufacturing tolerances of the belt. As a result, as shown in FIG. 14, a joint 251 that has a different interval from that of others is formed at a portion connecting between a leading edge and a trailing edge of the resin tape.

In order to maintain a distance from the mark detector 203 to the scale portion 202 to be constant, the scale portion 202 has to be attached to the intermediate transfer belt 10 such that the both ends of the scale portion 202 are separated at the location of the joint 251 so that the scale portion 202 does not overlap.

Then, a signal intensity as an output of the mark detector 203 at the location of the joint 251 drops for a certain time, and, therefore, an identifying mark 201 for identifying discontinuity corresponding to the size of the joint 251 is arranged at an opposite side of the location. The discontinuity identifying mark 201 is detected when it is opposed to the mark detector 204 in association with the endless movement of the belt, and, at that time, a certain discontinuity detected signal is continuously output. If the time during which the discontinuity detected signal is output and the time during which a signal indicating the joint 251 is output match each other, then there is no velocity difference between the both edges of the belt. If these times are displaced from each other, then there is a velocity difference therebetween. In this case, by using a time difference between the leading edge of the discontinuity detected signal and the leading edge of the output of the joint 251, or by using a time difference between the trailing edge of the output of the joint 251 and the output of the mark, an inclination of the belt is detected in the same manner as that of the second example.

This example allows the displacement of the marks formed at one pitch or more to be dealt with, and this does not require counting of the marks.

FIG. 15 represents an example of a detector for movement (belt shift) in the main scanning direction of the belt which is applied to the belt conveying device according to the first embodiment.

In this example, the marks 201 of the scale portion 202 are formed with a certain size in the main scanning direction, and light beams 220 and 221 respectively emitted from the mark detectors 203 and 204 are broadened in the main scanning direction. As shown in FIG. 15, reference detected positions are arranged in such a manner that the mark detector 203 on the left side (hereinafter, "sensor L") is shifted to the left and the mark detector 204 on the right side (hereinafter, "sensor R") is shifted to the right each with respect to the marks 201.

If so-called belt shift occurs, a detected width of the mark changes dependent on a belt position, and amounts of lights received by the sensors L and R on the left and right sides thereby change, and, therefore, the signal intensities of these sensors change, which allows detection of the change in the belt position in the main scanning direction.

FIGS. 16A to 16C represent signal waveforms, in this state, detected by the mark detectors when the intermediate transfer belt 10 moves in the main scanning direction or when belt shift occurs. When the intermediate transfer belt 10 is shifted to the right side, the output of a signal 231 of the sensor R rises, while a signal 230 of the sensor L lowers (see FIG. 16A). Conversely, when it is shifted to the left side, the signal 230 of the sensor L becomes high, while the signal 231 of the sensor R becomes low (see FIG. 16B). It should be noted that if there is no shift of the intermediate transfer belt 10, the signal intensities of the signals 230 and 231 of the sensors L and R respectively become nearly identical (see FIG. 16C).

By comparing the signal intensities of the sensors R and L in this manner, the position of the intermediate transfer belt 10 in the main scanning direction or the belt shift can be detected.

The two mark detectors 203 and 204 are configured in the above manner, and this allows measurement of the belt shift in addition to the moving velocity of the belt and the belt skew. Therefore, there is no need to provide additional sensors for respective measurements, and thus, reduction in the number of components and reduction in cost are achieved.

Figure 17:
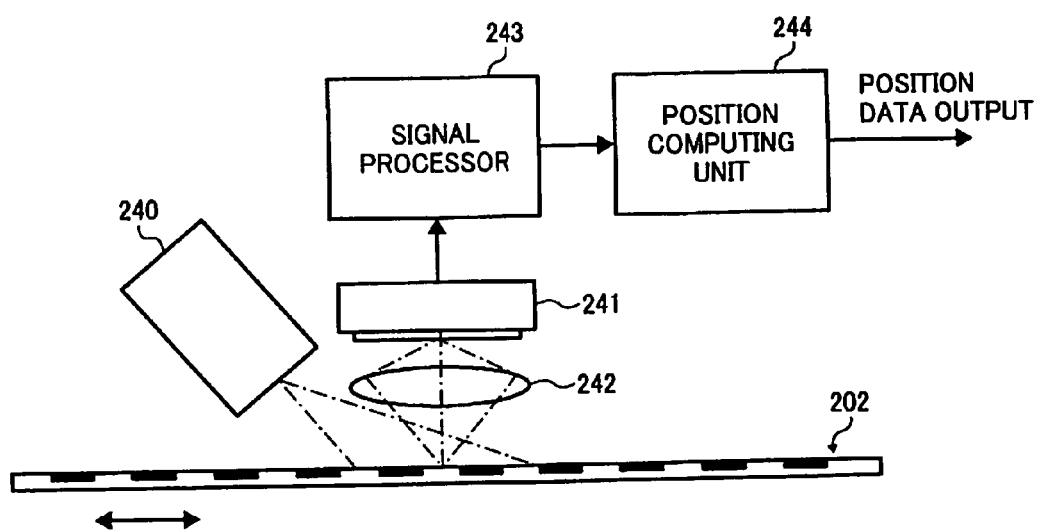
FIG. 17 is a schematic diagram representing a sensor unit in which a line sensor is used as another example of the belt shift detector.
Figure 18:
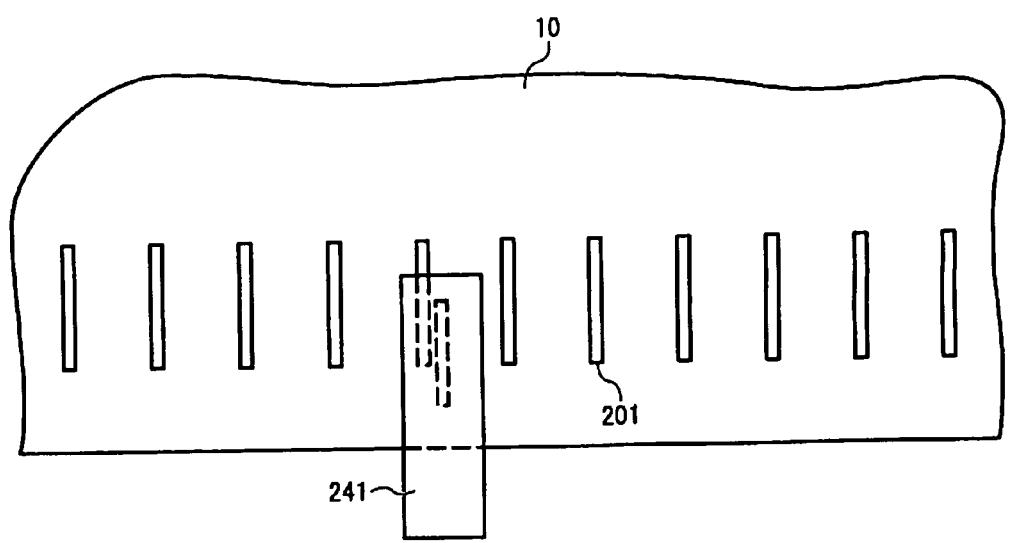
FIG. 18 is an explanatory diagram representing arrangement of marks and the line sensor when the line sensor is used as an imaging element as the belt shift detector.

FIG. 17 and FIG. 18 represent another example of the belt shift detector. In FIG. 17, numeral 240 represents a light source for irradiating the scale portion 202, numeral 241 represents a line sensor, numeral 242 represents a lens for converging irradiation beams of the scale portion 202 to the line sensor 241, numeral 243 represents a signal processor for processing a signal output from the line sensor 241, and numeral 244 represents a position computing unit that computes a position according to an output signal of the signal processor 243 and outputs position data.

In this example, the line sensor 241 is used instead of the light-receiving element 207 of the mark sensor. FIG. 17 represents a schematic diagram of a sensor unit when the line sensor 241 is used. A light beam emitted from the light source such as LED hits the scale portion 202, is reflected thereby, and a reflected light is received by the line sensor 241, where a signal of an intensity according to the amount of received light is output, passes through the signal processor 243, and position data of the belt is output by the position computing unit 244. FIG. 18 represents arrangement of the marks 201 and the line sensor 241 when the line sensor 241 is used as an imaging element.

A difference between using the line sensor 241 and using the light-receiving element 207 is explained. In the case of the light-receiving element 207, movement of the mark 201 is detected as a temporal change in signal, while in the case of the line sensor 241, the position of the mark when sampling is preformed is observed. Consequently, two line sensors 241 are arranged at both edges of the intermediate transfer belt 10, and sampling is simultaneously performed, so that position information of the marks 201 observed by the respective sensors can be obtained, and thus, changes in positions of the marks 201 due to the belt shift can be directly read.

As shown in FIG. 15, sensing is performed on reference detected positions by shifting the sensor L on the left side to the left and shifting the sensor R on the right side to the right with respect to the marks 201 of the scales, so that the positions of the marks 201 in the main scanning direction can be directly read.

Further, each mark 201 is opposed to the line sensor 241 in association with the conveyance of the intermediate transfer belt 10, and movement of each of the marks 201 in the sub-scanning direction is detected according to a detected period. With this information, the velocity of the intermediate transfer belt 10 in the sub-scanning direction can also be detected.

When the detection marks 201 as explained in the example are to be formed on the belt at equal intervals, the intervals of the detection marks may not be equal due to an error in the circumferential length of the belt. Thus, to form the detection marks at equal intervals along the whole circumference of the belt, an optimal interval is determined for each belt and the detection marks 201 need to be formed with high accuracy, which leads to an increase in manufacturing costs of the belt.

However, by providing a plurality of detection patterns in the main scanning direction so as to complement a portion where a detection pattern is not formed, and by appropriately selecting a mark detector, the marks can be detected along the whole circumference of the intermediate transfer belt. More specifically, by shifting start positions, from which marks are provided on each of the belts at constant intervals, a gap portion between a first mark and a last mark, which is different from a gap between the other marks, of each of the belts is shifted in the sub-scanning direction. By providing the plurality of detection patterns in the main scanning direction in this manner, harks shorter than the whole circumferential length of the intermediate transfer belt by a length of the gap portion can be formed. Thus, mark formation becomes easy, and an effect of cost reduction is achieved. Moreover, formation of the detection marks is facilitated, and this allows formation of marks with high accuracy.

In this case, as shown in FIG. 10, the marks 201 formed at a plurality of positions along the main scanning direction of the intermediate transfer belt 10 are detected by the mark detectors 203 and 204, respectively, and the velocity in the sub-scanning direction and a movement in the main scanning direction of the intermediate transfer belt 10 are detected. In order to detect belt velocity while bypassing the gap portion, a detection signal by the mark detector 204 is generated, when the gap portion is detected by one mark detector 204, by switching it to the other mark detector 203 by a switching unit, and thus, detection along the whole circumference of the intermediate transfer belt 10 becomes possible. Likewise, in order to detect belt shift while bypassing the gap portion, when the gap portion is detected by one mark detector, it is switched to the other mark detector by the switching unit, and a detection signal is generated.

By providing a circuit for computing a position of the intermediate transfer belt 10 from the detection signals of the mark detectors 203 and 204 (detection signals obtained by switching the detection signals output from the mark detectors 203 and 204 by the switching unit), the signal from the circuit can be used, as a signal obtained by averaging the detection signals from the mark detectors 203 and 204 or as a signal indicating that one complements the other, for velocity control or correction of the belt shift of the intermediate transfer belt 10.

Moreover, as shown in FIG. 10, the mark detectors 203 and 204 may be arranged at equivalent positions in the sub-scanning direction within the image transfer surface. The intermediate transfer belt 10 is often made of a resin material, and an extension of the belt in the sub-scanning direction occurs due to fluctuations of the environmental conditions such as temperature and humidity. Consequently, if the mark detectors 203 and 204 are arranged at different positions in the sub-scanning direction within the image transfer surface, the phase of a mark detection period fluctuates due to effects of extension of the intermediate transfer belt 10 in the sub-scanning direction, which may cause an error in detection of belt skew. Therefore, by arranging the mark detectors 203 and 204 at equivalent positions in the sub-scanning direction within the image transfer surface, the effect of extension of the belt due to the environmental fluctuation can be suppressed to a minimum.

Further, as shown in FIG. 10, the mark detectors 203 and 204 may be arranged near a middle position in the sub-scanning direction within the image transfer surface. The intermediate transfer belt 10 often made of a resin material has rigidity that is significantly low as compared with that of a roller around which the intermediate transfer belt 10 is wound, and thus, deformation may occur due to stress in a belt-surface inner direction occurring due to inclination of the roller. The deformation becomes large near the roller. Consequently, if the mark detectors 203 and 204 are arranged near the roller within the image transfer surface, an error may occur in detection of belt skew due to effect of the deformation in the belt-surface inner direction. Therefore, by arranging the mark detectors 203 and 204 near the middle position in the sub-scanning direction within the image transfer surface, it is possible to achieve skew correction and shift correction of the belt while suppressing the effect of the deformation in the belt-surface inner direction to the minimum.

Next, the image-forming-position correcting unit is explained.

As a correcting means for correcting an image forming position in the main scanning direction corresponding to a change in an angle of the intermediate transfer belt, there are a method of inclining the roller other than the steering roller by the same configuration and operation as these of the steering roller and a means for providing an optical-axis angle changing unit in a light path of an optical writing unit for forming a latent image on a photosensitive element to change a latent-image forming position on the photosensitive element.

Here, if any roller other than the steering roller is inclined to correct belt skew, by correcting the belt skew, belt shift changes, and by correcting the belt shift, the belt skew changes. Therefore, a high-function control system for performing complicated control is required, which leads to a cost increase. Moreover, in a case in which the optical-axis angle changing unit is provided in the light path of the optical writing unit, it is also necessary to provide an optical unit with high accuracy and high reliability, which leads to a cost increase.

Figure 19:
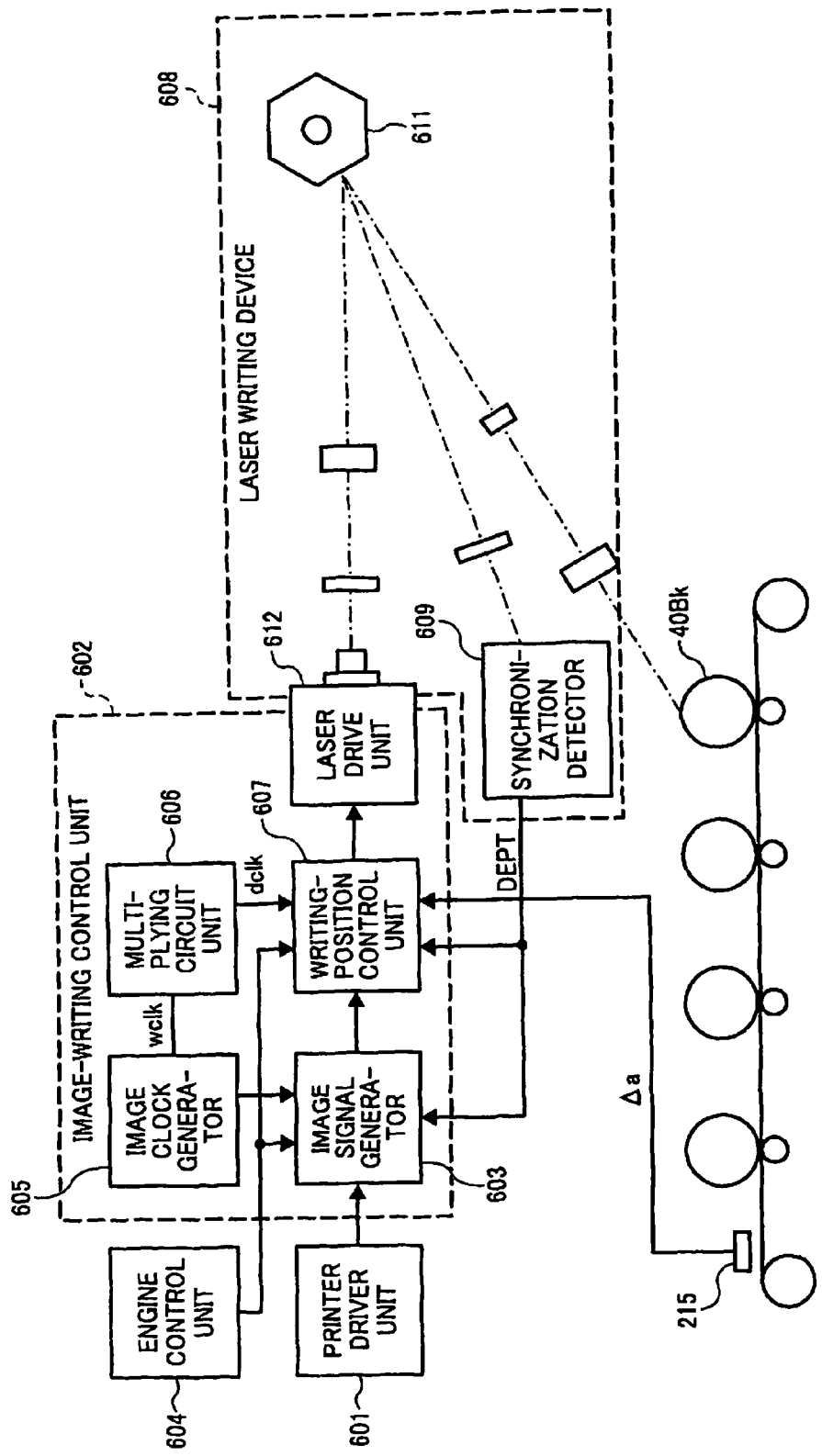
FIG. 19 is a block diagram representing a configuration of a latent-image-forming-position correcting unit in the image forming apparatus according to the first embodiment.

FIG. 19 is a block diagram representing a configuration of a latent-image-forming-position correcting unit in the image forming apparatus according to the present invention.

In FIG. 19, an image signal transferred from a printer driver unit 601 is input to an image signal generator 603 that forms an image-writing control unit 602. Further, engine control information sent from an engine control unit 604 is also input to the image-writing control unit 602. The image signal generator 603 performs image processing on the input image signal according to the engine control information. The image signal generator 603 actually develops the image on a recording paper sheet, and thus, the image signal is processed by a pixel clock signal (wclk) defining a minimum pixel used for image formation. As for the pixel clock signal, a pixel clock generator 605 generates a clock signal (wclk) of a predetermined frequency based on information such as resolution and linear velocity of the photosensitive element from the engine control unit 604, and inputs the generated clock signal to the image signal generator 603 and a multiplying circuit unit 606. A real image signal subjected to the image processing by the image signal generator 603 is input to a writing-position control unit 607. Input to the writing-position control unit 607 are also a synchronous detection signal (DETP) from a synchronization detector 609 of a laser writing device 608, a belt displacement signal (Δa) generated based on skew information sent from a belt skew detector 215 (corresponding to the mark detectors 203 and 204 in the first embodiment) on the intermediate transfer belt 10 and also based on engine control information from the engine control unit 604.

The synchronous detection signal (DETP) is a signal for keeping constant a writing start position in the main scanning direction when a laser beam is exposed on the photosensitive element 40Bk. The signal is an output signal being the laser beam that is reflected and deflected by a polygon mirror 611 in the laser writing device 608 to be output from a synchronization detection plate disposed outside a scan area on the photosensitive element 40Bk. A light-receiving element such as a photodiode is disposed as the synchronization detection sensor on the synchronization detection plate, and the synchronization detection sensor performs photoelectric conversion on the incident laser beam and outputs the synchronous detection signal (DETP).

The belt displacement signal (Δa) is a signal indicating displacement of the intermediate transfer belt 10 in the main scanning direction, and a signal in which the displacement of the intermediate transfer belt 10 in the main scanning direction within the image transfer surface inevitably occurring during correction of the belt shift by a belt-shift correcting unit is calculated from the belt skew detector 215.

The writing-position control unit 607 synthesizes the real image signal from the image signal generator 603 with the synchronous detection signal (DETP) at a predetermined timing, and generates a signal for driving a semiconductor laser being the light source. The writing-position control unit 607 controls a write-start timing of the real image signal from the synchronous detection signal according to the belt displacement signal (Δa). Input to the writing-position control unit 607 is a skew-correction clock signal (dclk) obtained by subjecting the pixel clock signal (wclk) generated by the pixel clock generator 605 to a multiplying process.

The skew-correction clock signal (dclk) is a signal of higher frequency, than the pixel clock signal, obtained by subjecting the pixel clock signal (wclk) defining a minimum pixel capable of image formation to the multiplying process. Moreover, the skew-correction clock signal (dclk) is a clock signal of frequency according to detection resolution of a transfer-slit position sensor, and one clock of the skew-correction clock signal (dclk) is equivalent to one resolution of the belt skew detector 215. The belt displacement signal (Δa) from the belt skew detector 215 is calculated, and the synchronous detection signal (DETP) and the belt displacement signal (Δa) are input to the writing-position control unit 607.

If A(=N×wclk) is a time from the synchronous detection signal to a start position of the real image signal in the main scanning direction when the belt displacement signal (Δa) is 0, and if Δa>0 is detected, then a delay time from the synchronous detection signal to a real-image writing timing is changed to A+Δa×dclk, while if there is no belt skew, then the real-image writing start position is delayed. On the other hand, if Δa<0, then the delay time is changed to A−Δa×dclk, and the real-image writing timing is made relatively faster.

Input to a laser drive unit 612 is a laser drive signal synthesized by the writing-position control unit 607. A turn-on/turn-off operation of a semiconductor laser implemented on the laser drive unit 612 is repeatedly driven by ON/OFF of the laser drive signal. The laser beam emitted by driving the semiconductor laser is incident on the laser writing device 608, and passes through or is reflected by a plurality of lenses and a mirror or the like, and travels in the light path. The laser beam is deflected by the rotation of the polygon mirror 611 disposed in the light path, to be exposed on the photosensitive element 40Bk in the main scanning direction. A process from the exposure to obtaining an output image is as explained above.

Figure 20:
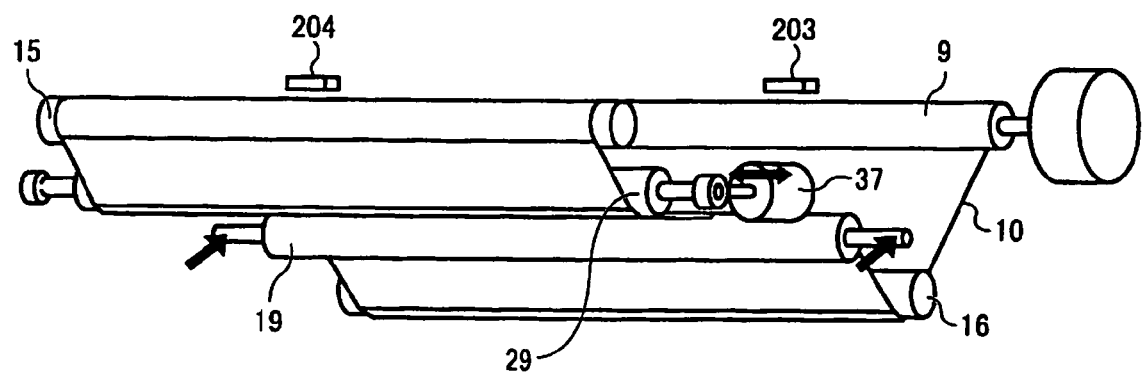
FIG. 20 is an explanatory diagram representing a belt-shift correcting unit according to the first embodiment.

Next, the belt-shift correcting unit is explained. FIG. 20 represents the belt-shift correcting unit according to the first embodiment.

The intermediate transfer belt 10 is stretched by a plurality of nearly parallel rollers, and is driven in the belt conveying direction by the drive roller 9 as one of the rollers. The drive roller 9 and the driven roller 15, and the secondary-transfer opposed roller 16 are fixed at predetermined positions, while both ends of a rotation axis of the tension roller 19 are biased in the arrow direction, and the intermediate transfer belt 10 is stretched with nearly constant tension.

Furthermore, there is provided a correction roller 29 for correcting shift occurring in the intermediate transfer belt 10 or for correcting movement thereof in the main scanning direction. One end of the rotation axis of the correction roller 29 is swingably supported in the direction perpendicular to the rotation axis by a pivot bearing or the like, and the other end is supported by an actuator 37 so as to be capable of reciprocal movement in the arrow direction.

Based on information on a belt skew amount from the belt shift detectors 203 and 204, the correction roller 29 is swung so that the intermediate transfer belt 10 moves in the direction opposite to a movement in the main scanning direction that is generated by driving the actuator 37. This allows the belt shift to be controlled within a fixed range and also allows the belt shift to be suppressed without providing another shift guide member or the like.

Second Embodiment

Next, belt shift control or the like of the belt conveying device different from that of the first embodiment is explained. As for the basic configuration of the belt conveying device and the configuration of the image forming apparatus provided with the belt conveying device, the same numerals are assigned to the same components as these shown in the first embodiment, and explanation thereof is omitted.

Figure 23:
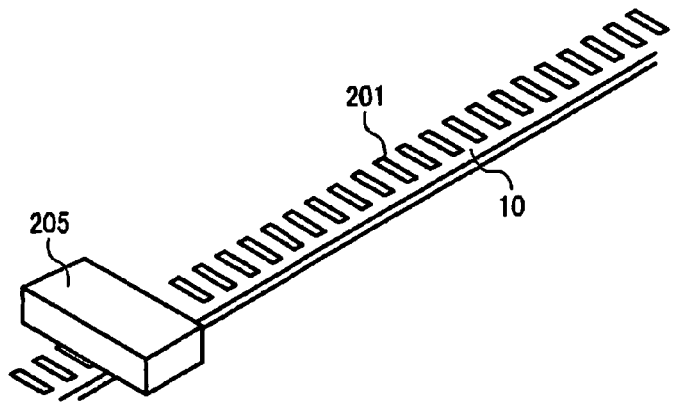
FIG. 23 is an explanatory diagram representing a partial configuration of a belt detector according to a second embodiment.

FIG. 23 is a partially detailed diagram representing a configuration of a belt detector for detecting a velocity and a shift of the belt according to a second embodiment. Here, explanation is made using a detector in the intermediate transfer belt 10.

As shown in FIG. 23, a plurality of detection marks 201 is formed at predetermined positions along the main scanning direction on the surface of the intermediate transfer belt 10 and at constant intervals along its whole circumference in the conveying direction. A belt-velocity and shift detector 205 is arranged so as to be opposed to the detection marks 201, so that movement of the detection marks in the sub-scanning direction and movement thereof in the main scanning direction can be detected. The belt-velocity and shift detector 205 sequentially detects a detection period of each of the detection marks, and this allows detection of belt velocity in the sub-scanning direction. Then, by controlling an intermediate-transfer-belt drive motor 12 (see FIG. 24) based on the detected belt velocity in the sub-scanning direction, the intermediate transfer belt 10 is conveyed at a target velocity with high accuracy. Furthermore, by sequentially detecting detected positions of the detection marks 201 in the main scanning direction one by one, a belt main-scanning movement can be detected. In this configuration, belt shift is detected by detecting the belt main-scanning movement of the detection mark 201 previously formed with high accuracy in order to detect the belt velocity in the sub-scanning direction. Therefore, as compared with the configuration in which the belt shift is detected by detecting positions of the belt edges as explained in the Japanese Patent Application Laid-open No. 2005-148127, there is no need to refer to previously measured edge data and to previously store data for averaged periodical fluctuation of the edge positions in a storage unit, and this allows high-speed detection and control of the belt shift without wasteful time with a configuration at a lower cost. It should be noted that in the second embodiment, as explained later, two belt-velocity and shift detectors 205 are arranged in the belt conveying direction.

Figure 24:
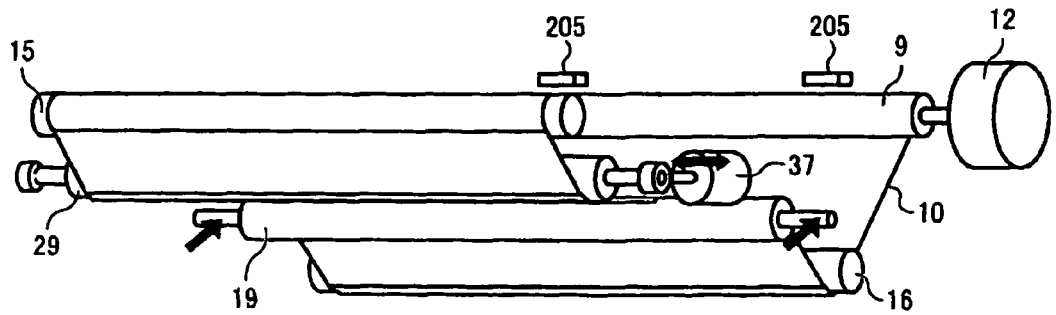
FIG. 24 is a perspective view representing a belt-shift correcting mechanism provided on the intermediate transfer belt according to the second embodiment.

FIG. 24 is a perspective view representing a belt-shift correcting mechanism provided on the intermediate transfer belt 10 according to the second embodiment.

In FIG. 24, the intermediate transfer belt 10 is stretched by a plurality of support rollers nearly parallel to each other, and is driven by the drive roller 9 as one of the support rollers in the belt conveying direction. The drive roller 9 is driven to rotate by the motor 12 being a drive source. The drive roller 9, the driven roller 15, and the secondary-transfer opposed roller 16 are fixed to predetermined positions, while both ends of the rotation axis of the tension roller 19 are biased in the arrow direction by a biasing unit (not shown), and the intermediate transfer belt 10 is stretched with nearly constant tension. The correction roller 29 corrects shift occurring in the intermediate transfer belt 10 or corrects movement thereof in the main scanning direction. One end of the rotation axis of the correction roller 29 is supported by a pivot bearing or the like, and the other end is supported so as to be swingable in the direction perpendicular to the rotation axis of the roller.

Furthermore, the actuator 37 being the belt-shift correcting unit is connected to the other end being swingable of the correction roller 29, and actuation of the actuator 37 allows the other end being swingable of the correction roller 29 to reciprocally move in the arrow direction.

Based on information from the belt-velocity and shift detector 205, the correction roller 29 is swung so that the belt moves in the direction opposite to the belt main-scanning movement that is generated by driving the actuator 37. This allows the belt shift to be controlled within a fixed range and also allows the belt shift of the intermediate transfer belt 10 to be suppressed without providing a shift guide member or the like.

Figure 25:
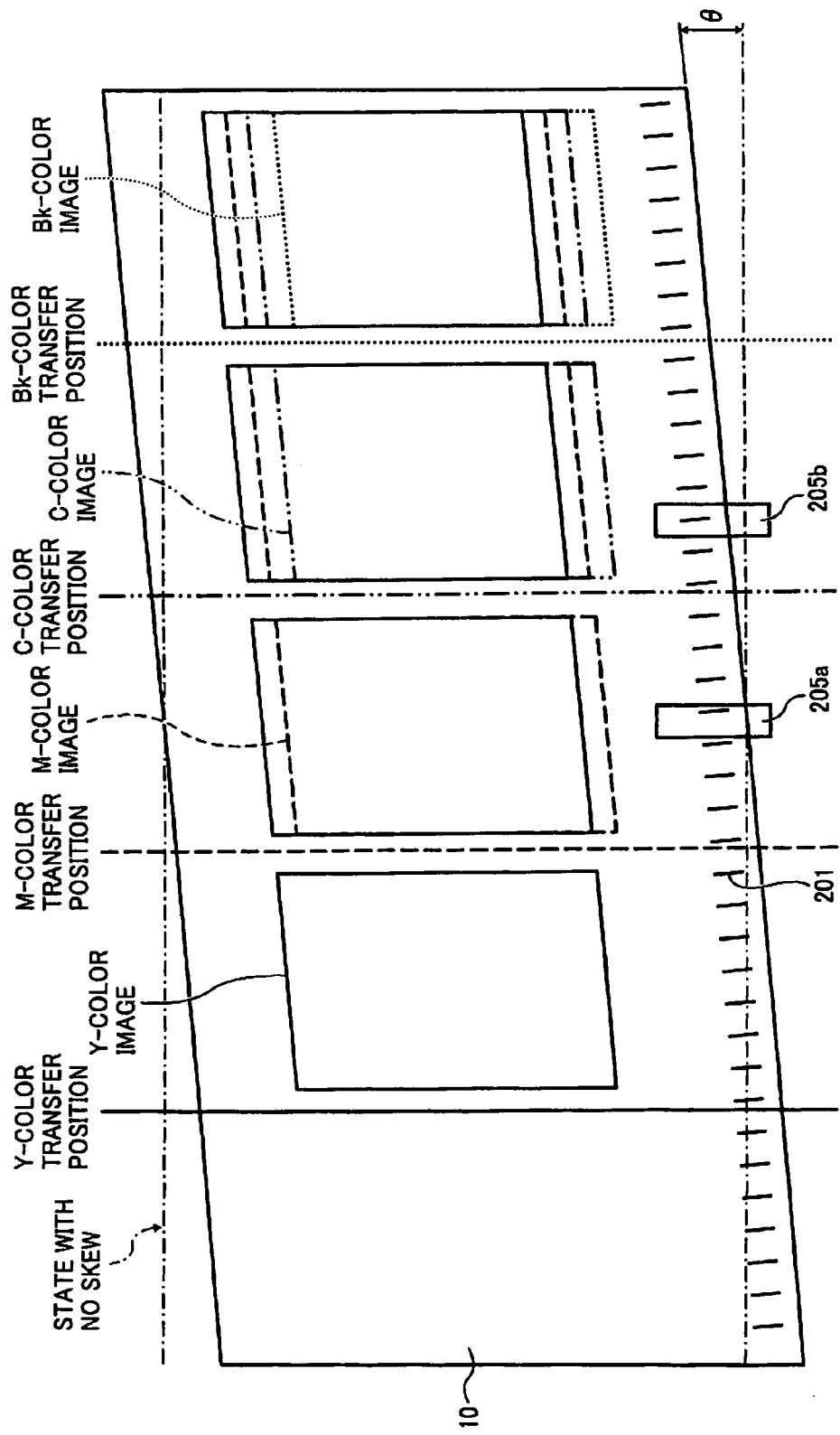
FIG. 25 is a schematic diagram explaining a conveying state of the intermediate transfer belt according to the second embodiment.

FIG. 25 is a schematic diagram explaining a conveying state of the intermediate transfer belt 10.

In FIG. 25, the intermediate transfer belt 10 is conveyed in a direction inclined at the skew angle θ on the image transfer surface due to the effect of inclination of the rollers for conveying the belt (state indicated by the solid line in this figure). Therefore, the image formed on the image transfer surface is inclined at the skew angle θ, and each transfer position, on the intermediate transfer belt, of the images of the colors formed on the image carriers for the colors is displaced in the main scanning direction. In other words, there occur image distortion and color misregistration in the color image.

Figure 26:
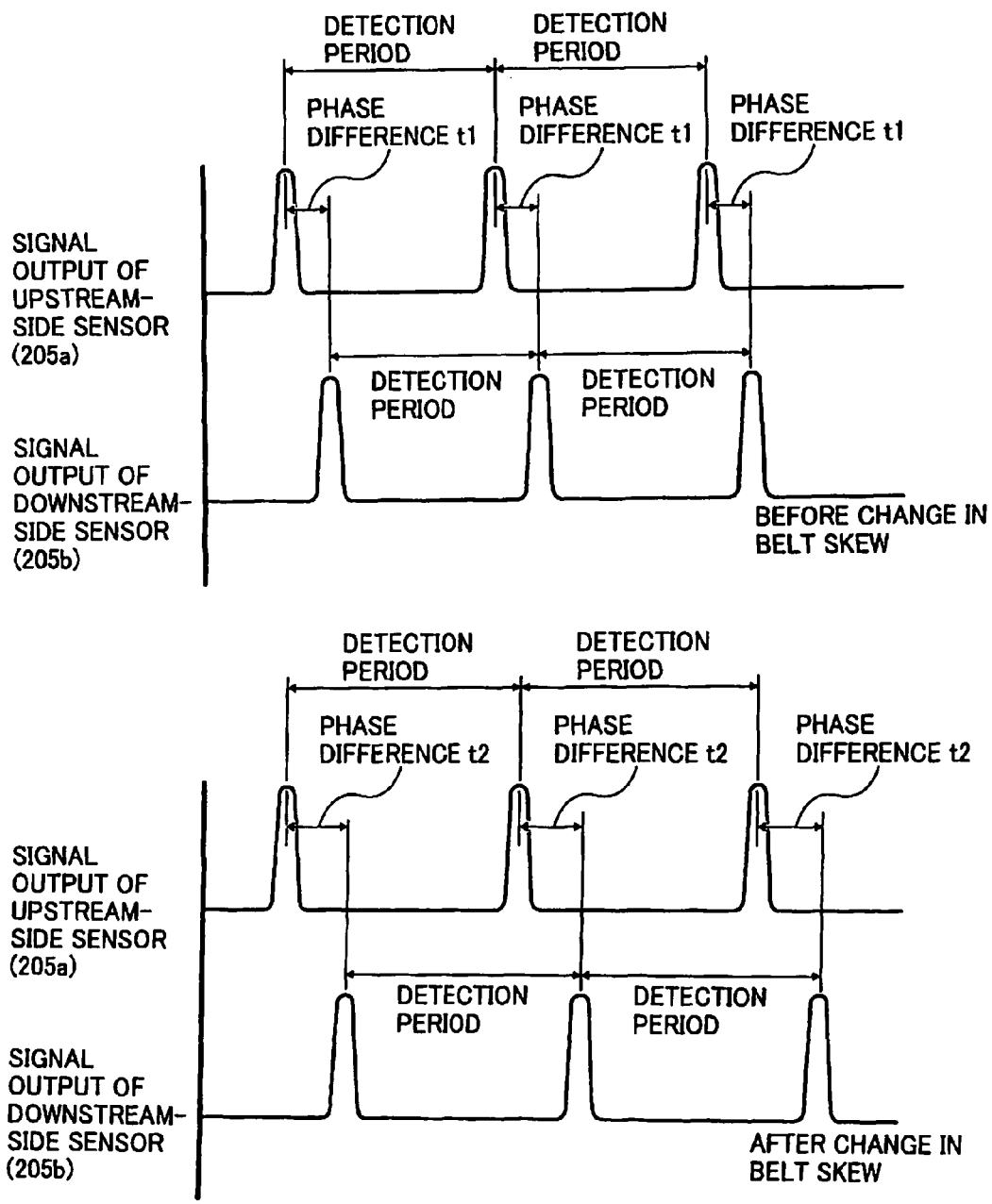
FIG. 26 is waveform diagrams representing detection signals of belt-velocity and shift detectors provided in two locations along the sub-scanning direction according to the second embodiment.

Moreover, the timing of detecting the detection marks 201 provided to detect the velocity in the sub-scanning direction and detect the movement in the main scanning direction of the belt by the belt-velocity and shift detector 205 is also changed caused by the effect of the skew angle θ of the belt. Here, FIG. 26 represents signals detecting the detection marks by the respective belt-velocity and shift detectors when belt-velocity and shift detectors 205a and 205b are arranged in two locations of the belt in the sub-scanning direction opposed to the detection marks 201 provided to detect the velocity in the sub-scanning direction and the movement in the main scanning direction of the belt.

The belt length between the two detected positions changes due to the belt skew. Assuming one of the mark detection timings at the two detected positions along the sub-scanning direction is set as a reference, the other of the mark detection timings changes. As shown in FIG. 26, if the belt skew changes, a phase difference between mark detection periods at the two detected positions along the sub-scanning direction changes. Thus, by detecting a fluctuation of the phase difference, detection of a change in the skew angle of the belt becomes possible. An image forming position on the intermediate transfer belt 10 in the main scanning direction is corrected by an image-forming-position correcting unit, explained later, according to the change in the skew angle of the belt occurring after the image forming position is adjusted. Such adjustment is generally performed upon activation of the image forming apparatus or the like. This allows image distortion and color misregistration to be corrected.

Figure 27A:
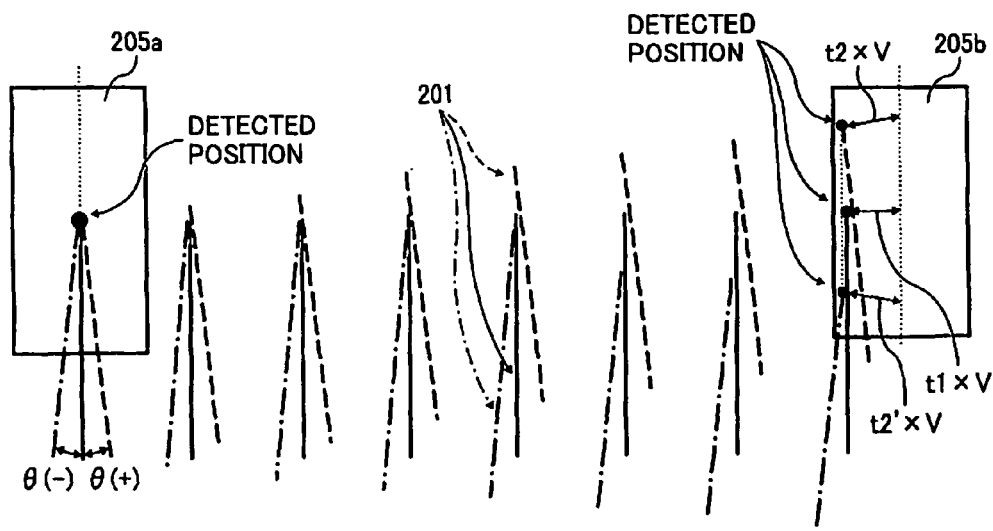
FIGS. 27A and 27B are schematic diagrams each representing how to detect detection marks when skew occurs in the belt according to the second embodiment.

A situation is assumed in which the two belt-velocity and shift detectors 205a and 205b in FIG. 25 detect the detection marks 201 at equivalent positions in the main scanning direction. Assuming t1 is a phase difference between the detection signals of the two belt-velocity and shift detectors 205a and 205b before the belt skew changes as shown in FIG. 26, t2 and t2' are phase differences each between the detection signals after the belt skew changes, and V is a conveyance velocity of the belt in the sub-scanning direction, then, as shown in FIG. 27A, both t2 when the skew angle θ is + (counterclockwise in the figure) and t2' when it is − (clockwise in the figure) become t1<t2 and t1<t2' respectively. In this case, even if the change amount of the skew angle can be detected, the direction of the change cannot be detected, and, therefore, a unit for detecting the direction of changing the skew is separately required to correct the image forming position.

Figure 27B:
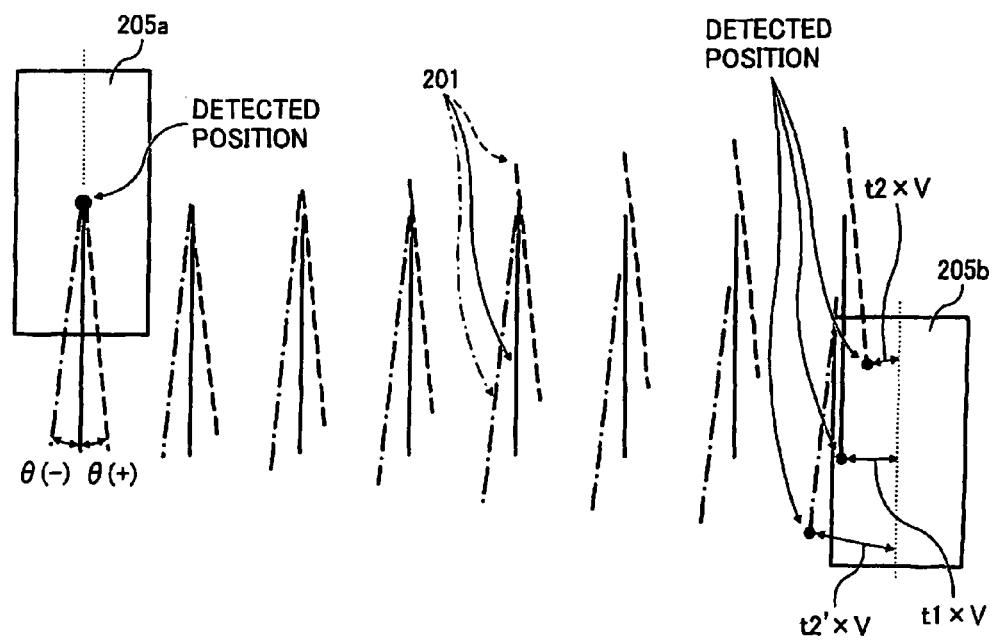

In contrast, in the case where different positions of the detection marks 201 in the main scanning direction are detected by the two belt-velocity and shift detectors 205a and 205b, as shown in FIG. 27B, t1>t2 when the skew angle θ is + (counterclockwise in the figure), and t1<t2' when it is − (clockwise in the figure), and thus, the change amount and change direction of the skew angle θ can be detected.

As is clear from this figure, the change in the phase difference between the detection signals in response to the change in the skew angle θ becomes the largest when the both edges of the detection marks 201 in the main scanning direction are detected by the two belt-velocity and shift detectors 205a and 205b, respectively, and this case allows most sensitive detection of the change in the skew angle θ. Moreover, compared to a case in which a position other than the edges of the detection marks is detected, detecting the edge position can be made with a simpler configuration with a lower cost. Also, various methods can be applied.

Figure 28:
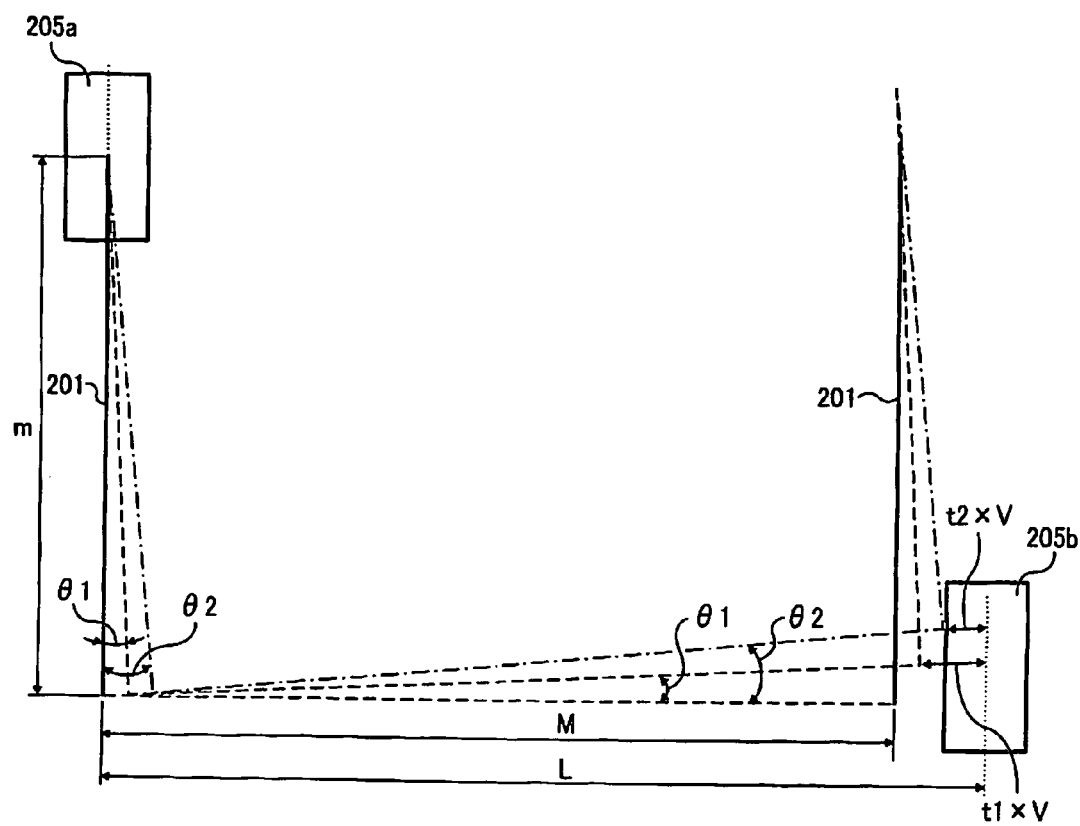
FIG. 28 is a schematic diagram explaining a phase difference between detection signals of the two detectors according to the second embodiment.

As shown in FIG. 28, if t1>t2 where t1 is a phase difference between the detection signals of the two belt-velocity and shift detectors 205a and 205b before adjustment of the image forming position (before the change in belt skew) and t2 is a phase differences therebetween after the change in belt skew, it is understood that the transfer surface of the belt is rotated in a direction (counterclockwise) in which the skew angle θ in the figure increases, and the following relation holds:

$$L=(m \times \tan \theta 1 + M + t1 \times V) \times \cos \theta 1 = (m \times \tan \theta 2 + M + t2 \times V) \times \cos \theta 2$$

where θ1 is a skew angle before the belt skew changes, θ2 is a skew angle after the belt skew changes, L is a distance in the sub-scanning direction between the two belt-velocity and shift detectors 205a and 205b, V is a conveyance velocity in the sub-scanning direction of the belt, m is a length in the main scanning direction of the detection mark 201, and M is a distance between the detection marks in the sub-scanning direction detected by the two belt-velocity and shift detectors 205a and 205b.

Here, because θ1 and θ2 are minute angles, if cos θ1=1, cos θ2=1, tan θ1=θ1, and tan θ2=θ2, then, $$m \times \theta 2 - m \times \theta 1 = t1 \times V - t2 \times V.$$

A skew angle (θ2−θ1) changed after adjustment of the image forming position becomes $$\theta 2 - \theta 1 = -(t2-t1)V/m$$

$$t2-t1 = -(\theta 2 - \theta 1)m/V$$

Therefore, a change (θ2−θ1) of the skew angle can be determined from the change (t2−t1) in the phase difference between the detection signals of the belt-velocity and shift detectors 205a and 205b, and thus, it is understood that, the longer the length in the main scanning direction of the detection mark 201, the larger the phase difference becomes when the skew angle is changed at the same degree, or that high-sensitive detection becomes possible.

Next, the control of the conveyance velocity (velocity in the sub-scanning direction) of the intermediate transfer belt 10 is explained.

By detecting velocity information using the belt velocity detector provided in plural in the sub-scanning direction (in the example, the belt-velocity and shift detectors 205a and 205b), a detection error can be reduced. The detection marks 201 are detected at different locations in the sub-scanning position by the detectors, and this allows reduction in the detection error at the main-scanning positions of the detection marks.

This means that the same effect can be obtained also in the belt shift detector.

Further, by providing a plurality of belt velocity detectors (in the example, the belt-velocity and shift detectors 205a and 205b) in the sub-scanning direction and appropriately selecting a mark detector so as to complement a portion where a detection pattern is not formed, the marks can be detected along the whole circumference of the intermediate transfer belt 10.

This is a problem that when the detection marks are to be continuously formed at equal intervals, an interval between a mark last formed and a mark initially formed is different from an interval between the other marks due to an error of a belt circumferential length. To form the detection marks at equal intervals along the whole circumference of the belt, it is necessary to determine an optimal interval for each belt and to form the detection marks with high accuracy, which leads to an increase in manufacturing costs. On the other hand, by providing a plurality of belt velocity detectors in the sub-scanning direction, the detection pattern shorter than the whole circumference of the intermediate transfer belt 10 can be formed. This makes it easier to form detection marks, which leads to an effect of cost reduction. Moreover, there are advantages that the operation of forming the detection marks is facilitated and the high-accuracy detection marks can be formed.

In FIG. 25, the detection marks 201 are detected by the belt-velocity and shift detectors 205a and 205b arranged in a plurality positions on the intermediate transfer belt 10 in the sub-scanning direction, and the velocity in the sub-scanning direction and the movement in the main scanning direction of the intermediate transfer belt 10 are detected.

The detection signal of the belt-velocity and shift detector 205b is switched by the switching unit at a portion with no detection signal of the belt-velocity and shift detector 205a, to generate the detection signal, so that detection becomes possible along the whole circumference of the intermediate transfer belt 10.

At this time, by providing a circuit that computes a position of the intermediate transfer belt 10 from the detection signals of the belt-velocity and shift detectors 205a and 205b (the detection signals to which the detection signals from the belt-velocity and shift detectors 205a and 205b are switched by the switching unit), the signal from the circuit can be used, as the signal in which the detection signals from the belt-velocity and shift detectors 205a and 205b are averaged or as the signal in which one complements the other, for velocity control and shift correction of the intermediate transfer belt 10.

Therefore, the belt-shift correcting unit 215 in the block diagram of FIG. 19 corresponds to the belt velocity and shift correcting unit 205 according to the second embodiment.

The belt displacement signal ($\Delta a$) is a signal indicating a displacement of the intermediate transfer belt 10 in the main scanning direction, and a signal in which the displacement of the intermediate transfer belt 10 in the main scanning direction within the image transfer surface, occurring during correction of belt shift by the belt velocity and shift correcting unit 205, is calculated from the belt skew information.

The skew-correction clock signal (dclk) is a clock signal of a frequency according to detection resolution of a transfer-slit position sensor, and one clock of the skew-correction clock signal (dclk) is equivalent to one resolution of the belt skew information. The belt displacement signal ($\Delta a$) calculated from the belt skew information is detected, and the synchronous detection signal (DETP) and the belt displacement signal ($\Delta a$) are input to the writing-position control unit 607. If $A(=N \times wclk)$ is a time from the synchronous detection signal to a start position of the real image signal in the main scanning direction when the belt displacement signal ($\Delta a$) is 0, and if $\Delta a > 0$ is detected, then a delay time from the synchronous detection signal to a real-image writing timing is changed to $A + \Delta a \times dclk$, while if there is no belt skew, then the real-image writing start position is delayed. On the other hand, if $\Delta a < 0$, then the delay time is changed to $A - \Delta a \times dclk$, and the real-image writing start timing is made relatively faster.

Input to the laser drive unit 612 is a laser drive signal synthesized by the writing-position control unit 607. A turn-on/turn-off operation of a semiconductor laser implemented on the laser drive unit 612 is repeatedly driven by ON/OFF of the laser drive signal. The laser beam emitted by driving the semiconductor laser is incident on the laser writing device, and passes through or is reflected by a plurality of lenses and a mirror or the like, and travels in the light path. The laser beam is deflected by the rotation of the polygon mirror 611 disposed in the light path, to be exposed on the photosensitive element in the main scanning direction. The process from the exposure to obtaining an output image is as explained above.

Based on the configuration, by controlling a latent-image forming position on the photosensitive element being the image carrier based on the belt skew information obtained from the belt-velocity and shift detector 205, it is possible to prevent image distortion and color misregistration due to the displacement in the main scanning direction, which allows significantly high quality of an output image without providing a highly functional control system and a high-accuracy optical unit which cause a cost increase.

The present invention has been explained with reference to the drawings, however, the present invention is not limited thereto. For example, as the belt-velocity and shift detector, anything with an appropriate configuration can be adopted.

Further, the detector may be arbitrarily located within a range where the present invention can be achieved. The detection mark provided on the endless belt can be formed with an appropriate configuration. The endless belt may be stretched arbitrarily by using any form.

An imaging portion of the image forming apparatus may be arbitrarily configured, and the imaging units for the colors in the tandem system may be arbitrarily arranged. The number of the imaging units is not limited to four. Moreover, the system is not limited to the tandem system, and thus, any configuration in which a plurality of developing devices are arranged around one photosensitive element or in which a revolver type developing device is used is possible. It goes without saying that the image forming apparatus is not limited to a printer, but may be a copy machine, a facsimile, or a multifunction product provided with a plurality of functions.

As explained above, the present invention can be used for velocity control of a belt-like endless moving member requiring high-accuracy velocity control in various devices, and is particularly suitable for high-accuracy velocity control or position control for the endless moving member such as the intermediate transfer belt and the photosensitive element related to image formation of various image forming apparatuses. Moreover, by adopting the belt conveying device to the color image forming apparatus, it is possible to prevent color misregistration or the like and to form a high-quality full-color image at any time.

According to the present invention, the shift guide member or the like is not used, but there are used the scale portion formed of a plurality of marks continuously provided at predetermined intervals on the both edges of the endless belt along the sub-scanning direction, and the mark detectors, to read these marks, arranged on the both edges of the endless belt in the main scanning direction perpendicular to the sub-scanning direction. Thus, the present invention has an effect that a skew angle is determined by a moving velocity using the mark detection signals and that skew correction and correction of an image are possible based on the skew angle without being affected by the shape of the belt edges during belt skew sensing.

Furthermore, according to the present invention, because the conveyance velocity of the belt can already be detected, the conveyance velocity of the belt can be sensed and controlled without addition of another sensor, and thus, the present invention has an effect that cost reduction is achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A belt conveying device, comprising:
an endless belt stretched by a plurality of rollers;
a drive unit that is connected to one of the plurality of rollers and drives the roller;
a plurality of belt velocity detectors that are arranged at a plurality of locations along a belt width direction perpendicular to a moving direction of the endless belt and detect conveyance velocities of the endless belt; and
a belt-inclination calculating unit that calculates an inclination of the endless belt in the moving direction from a difference between conveyance velocities of the endless belt detected by the plurality of belt velocity detectors,
wherein the plurality of belt velocity detectors include:

a scale portion formed of marks continuously provided on the endless belt at set intervals along the moving direction;

a mark detector that detects the mark in the scale portion; and a belt-velocity calculating unit that calculates the velocity of the endless belt based on a result of detection of the mark detector, wherein the belt-inclination calculating unit calculates an inclination with respect to the moving direction of the endless belt based on a time difference between a plurality of mark detection signals obtained from the mark detector and a result calculated by the belt-velocity calculating unit, wherein the scale portions are provided in both edges of the endless belt in the belt width direction perpendicular to the moving direction of the endless belt, the mark detector is provided in both edges in the belt width direction so as to correspond to the scale portions, and wherein an interval between the marks provided in one edge portion of the endless belt in the belt width direction is larger than an interval between the marks provided in the other edge portion.

2. The belt conveying device according to claim 1, wherein the mark detector is disposed near a middle position of a length in the moving direction of the endless belt.

3. The belt conveying device according to claim 1, wherein an interval between the marks of the scale portion provided in one edge portion of the endless belt in the belt width direction and an interval between the marks of the scale portion provided in the other edge portion are substantially the same.

4. The belt conveying device according to claim 1, wherein one or more mark-interval discontinuous portions with a mark interval different from other intervals is formed in the scale portion provided in one edge of the endless belt in the belt width direction, and an identifying mark that is different from the marks provided in the one edge is formed on a position in the other edge corresponding to the mark-interval discontinuous portion.

5. The belt conveying device according to claim 4, wherein the identifying mark is a mark for detecting the mark-interval discontinuous portion, and the mark detector outputs a discontinuity detected signal when the identifying mark is detected.

6. The belt conveying device according to claim 1, further comprising a plurality of belt shift detectors that are arranged at a plurality of locations along the belt width direction perpendicular to the moving direction of the endless belt and detect positions in the belt width direction of the endless belt.

7. The belt conveying device according to claim 6, wherein the belt shift detector includes:

a scale portion formed of marks continuously provided on the endless belt at set intervals along the moving direction;

a mark detector that detects the mark in the scale portion; and a belt-shift calculating unit that calculates positional changes in the belt width direction of the endless belt based on a result of detection of the mark detector.

8. The belt conveying device according to claim 6, further comprising a belt-shift correcting unit that corrects a belt shift indicating movement of the endless belt in the belt width direction based on a result of detection obtained from the belt shift detector.

9. The belt conveying device according to claim 1, wherein the mark detector is a one-dimensional or a two-dimensional sensor.

10. A belt conveying device, comprising:

an endless belt stretched by a plurality of rollers;

a drive unit that is connected to one of the plurality of rollers and drives the roller;

a plurality of belt moving distance detectors that are arranged at a plurality of locations along a belt width direction perpendicular to a moving direction of the endless belt and detect moving distances of the endless belt; and a belt-inclination calculating unit that calculates an inclination of the endless belt in the moving direction from a difference between moving distances of the endless belt detected by the plurality of belt moving distance detectors, wherein the plurality of belt moving distance detectors include:

a scale portion formed of marks continuously provided on the endless belt at set intervals along the moving direction;

a mark detector that detects the mark in the scale portion; and a belt-moving-distance calculating unit that calculates the moving distance of the endless belt based on a result of detection of the mark detector, wherein the belt-inclination calculating unit calculates an inclination with respect to the moving direction of the endless belt based on a time difference between a plurality of mark detection signals obtained from the mark detector and a result calculated by the belt-moving-distance calculating unit, wherein the scale portions are provided in both edges of the endless belt in the belt width direction perpendicular to the moving direction of the endless belt, the mark detector is provided in both edges in the belt width direction so as to correspond to the scale portions, and wherein an interval between the marks provided in one edge portion of the endless belt in the belt width direction is larger than an interval between the marks provided in the other edge portion.

11. The belt conveying device according to claim 10, wherein an interval between the marks of the scale portion provided in one edge portion of the endless belt in the belt width direction and an interval between the marks of the scale portion provided in the other edge portion are substantially the same.

12. The belt conveying device according to claim 10, further comprising a plurality of belt shift detectors that are arranged at a plurality of locations along the belt width direction perpendicular to the moving direction of the endless belt and detect positions in the belt width direction of the endless belt.

13. The belt conveying device according to claim 12, wherein the belt shift detector includes:

a scale portion formed of marks continuously provided on the endless belt at set intervals along the moving direction;

a mark detector that detects the mark in the scale portion; and a belt-shift calculating unit that calculates positional changes in the belt width direction of the endless belt based on a result of detection of the mark detector.

14. The belt conveying device according to claim 12, further comprising a belt-shift correcting unit that corrects a belt shift indicating movement of the endless belt in the belt width direction based on a result of detection obtained from the belt shift detector.

15. The belt conveying device according to claim 10, wherein the mark detector is a one-dimensional or a two-dimensional sensor.

16. An image forming apparatus that transfers a toner image formed on an image carrier to a recording medium through an intermediate transfer belt formed of an endless belt, the image forming apparatus comprising:
- a plurality of belt-velocity and shift detectors each detects a velocity of the endless belt and a shift of the endless belt in a main scanning direction; and
- an image-forming-position correcting unit that corrects an image forming position in the main scanning direction on the image carrier, wherein
- detection marks are provided on the endless belt at constant intervals in a sub-scanning direction,
- the plurality of belt-velocity and shift detectors detect the belt velocity by detecting sub-scanning movement of the detection marks, and detect a belt shift by detecting main-scanning movement of the detection marks, and
- the plurality of belt-velocity and shift detectors are arranged along the sub-scanning direction of the endless belt, and an image forming position in the main scanning direction is corrected by the image-forming-position correcting unit based on movements of the detection marks in the sub-scanning direction detected at different positions in the main scanning direction by the plurality of belt-velocity and shift detectors.

17. The image forming apparatus according to claim 16, wherein the different positions in the main scanning direction of the detection marks are both edges in the main scanning direction of the detection marks.

18. The image forming apparatus according to claim 16, further comprising a belt-velocity control unit that controls the velocity of the endless belt, wherein the velocity of the endless belt is controlled by the belt-velocity control unit based on velocity information detected by the plurality of belt-velocity and shift detectors.

19. The image forming apparatus according to claim 16, further comprising a belt-shift correcting unit that corrects main-scanning movement of the endless belt, wherein the main-scanning movement of the endless belt is corrected by the belt-shift correcting unit based on belt shift information detected by the plurality of belt-velocity and shift detectors.

20. The image forming apparatus according to claim 16, wherein the image carrier comprises a plurality of image carriers, and toner images of colors formed on the plurality of image carriers are sequentially transferred to the intermediate transfer belt in a superimposing manner to form an image of a plurality of colors.

* * * * *